United States Patent
Göransson et al.

(10) Patent No.: US 9,385,904 B2
(45) Date of Patent: Jul. 5, 2016

(54) METHOD AND APPARATUS FOR PILOT POWER ALLOCATION IN A MULTI ANTENNA COMMUNICATION SYSTEM

(71) Applicant: Optis Cellular Technology, LLC, Plano, TX (US)

(72) Inventors: Bo Göransson, Sollentuna (SE); Erik Larsson, Uppsala (SE); Qingyu Miao, Beijing (CN); Sairamesh Nammi, Stockholm (SE)

(73) Assignee: Optis Cellular Technology, LLC, Plano, TX (US)

( * ) Notice: Subject to any disclaimer, the term of this patent is extended or adjusted under 35 U.S.C. 154(b) by 623 days.

(21) Appl. No.: 13/816,039

(22) PCT Filed: Jan. 22, 2013

(86) PCT No.: PCT/SE2013/050047
§ 371 (c)(1),
(2) Date: Feb. 8, 2013

(87) PCT Pub. No.: WO2013/115706
PCT Pub. Date: Aug. 8, 2013

(65) Prior Publication Data
US 2014/0056374 A1   Feb. 27, 2014

Related U.S. Application Data

(60) Provisional application No. 61/592,319, filed on Jan. 30, 2012.

(51) Int. Cl.
*H04L 27/26* (2006.01)
*H04W 52/32* (2009.01)
(Continued)

(52) U.S. Cl.
CPC ......... *H04L 27/2601* (2013.01); *H04W 52/325* (2013.01); *H04W 52/343* (2013.01); *H04W 52/42* (2013.01); *H04W 52/143* (2013.01); *H04W 52/241* (2013.01)

(58) Field of Classification Search
CPC ........... H04L 27/2601; H04W 52/325; H04W 52/42; H04W 52/146; H04W 52/143; H04W 52/16
USPC .................. 370/252, 329, 311, 328; 455/522; 375/267
See application file for complete search history.

(56) References Cited

U.S. PATENT DOCUMENTS

| | | | | |
|---|---|---|---|---|
| 8,472,335 B2 * | 6/2013 | De Pasquale | ........ | H04B 7/0413 370/252 |
| 2004/0166886 A1 | 8/2004 | Laroia et al. | | |

(Continued)

OTHER PUBLICATIONS

3rd Generation Partnership Project, "Initial Discussion on Pilot Design for 4-Branch MIMO." 3GPP TSG RAN WG1 Meeting #66bis. R1-113431. Zhuhai, P.R. China, Oct. 10th-14th, 2011.

(Continued)

*Primary Examiner* — Jamal Javaid
(74) *Attorney, Agent, or Firm* — Thomas L. Crisman; Lewis W. Schiel

(57) ABSTRACT

The embodiments herein relate to a method in a base station (301) for determining adjustment of common pilot power in a four-way transmit antenna, 4Tx, communications system (300). The base station (301) comprises a first transmit antenna (1201), a second transmit antenna (1202), a third transmit antenna (1203) and a fourth transmit antenna (1204). The base station (301) identifies a set of scheduled user equipments (310) in the communications system (300). The base station (301) determines that the common pilot power should be adjusted based on a criterion associated with the set of scheduled user equipments (310).

14 Claims, 18 Drawing Sheets

(51) Int. Cl.
*H04W 52/42* (2009.01)
*H04W 52/34* (2009.01)
*H04W 52/14* (2009.01)
*H04W 52/24* (2009.01)

(56) References Cited

U.S. PATENT DOCUMENTS

2008/0214128 A1* 9/2008 Lim ................ H04B 7/061 455/101
2010/0273500 A1* 10/2010 Dominguez Romero ............ E06B 3/9642 455/452.2

OTHER PUBLICATIONS

3rd Generation Partnership Project, "Pilot Design for DL 4-Branch MIMO." 3GPP TSG-RAN WG1 Meeting #66. R1-112978. Zhuhai, China, Oct. 10th-14th, 2011.
3rd Generation Partnership Project, "Impact of Common Pilot Gating on the 4 branch MIMO Link Performance." 3GPP TSG RAN WG1 Meeting #68. R1-120353. Dresden, Germany, Feb. 6-10, 2012.
3rd Generation Partnership Project, "Four Branch MIMO Performance with Common Pilot Gating." 3GPP TSG RAN WG1 #68bis. R1-121755. Jeju, South Korea, Mar. 26th-30th, 2012.
3rd Generation Partnership Project, "Remaining details of pilot design for 4-branch HSDPA." 3GPP TSG-RAN WG1 Meeting #70. R1-123125. Qingdao, China Aug. 13th-17th, 2012.
3rd Generation Partnership Project, "Overall Summary of Pilot Design Schemes in Four branch MIMO System." 3GPP TSG-RAN WG1 #69. R1-122810. Prague, Czech Republic, May 21st-25h, 2012.
3rd Generation Partnership Project. "4-branch MIMO for HSDPA." 3GPP TSG RAN WG1 Meeting #65, R1-111763, May 9-13, 2011, Barcelona, Spain.
3rd Generation Partnership Project. "Common Pilot Design for Four Branch MIMO System." 3GPP TSG RAN WG1 Meeting #68, R1-120352, Feb. 6-10, 2012, Dresden, Germany.
3rd Generation Partnership Project. "New WI: Four Branch MIMO transmission for HSDPA (Core Part)." 3GPP TSG-RAN meeting #53, RP-111393, Sep. 13-16, 2011, Fukuoka, Japan.
3rd Generation Partnership Project. "New WI: Four Branch MIMO transmission for HSDPA (Feature Part)." 3GPP TSG-RAN meeting #53, RP-111393, Sep. 13-16, 2011, Fukuoka, Japan.
3rd Generation Partnership Project. "New WI: Four Branch MIMO transmission for HSDPA (Performance Part)." 3GPP TSG-RAN meeting #53, RP-111393, Sep. 13-16, 2011, Fukuoka, Japan.
Alcatel-Lucent et al, 3rd Generation Partnership Project. "Remaining details of pilot design for 4-branch HSDPA." 3GPP TSG-RAN WG1 Meeting #70, R1-123125, Aug. 13-17, 2012, Qingdao, China.
International Preliminary Report on Patentability, Application No. PCT/SE2013/050047, mailed on Jan. 30, 2013.
International Search Report and Written Opinion, Application No. PCT/SE2013/050047, mailed on Aug. 20, 2013.
Ericsson et al, Initial discussion on pilot design for 4-branch MIMO, R1-113431, 3GPP TSG RAN WG1 Meeting #66bis, Zhuhai, P.R. China, Oct. 10th-14th, 2011, 4 pgs.
Ericsson, Impact of Common Pilot Gating on the 4 branch MIMO Link Performance, R1-120353, 3GPP TSG RAN WG1 Meeting #68, Dresden, Germany, Feb. 6th-10th, 2012, 8 pgs.
Ericsson, Four Branch MIMO Performance with Common Pilot Gating, R1-121755, 3GPP TSG RAN WG1 #68bis, Jeju, South Korea, Mar. 26th-30th, 2012, 8 pgs.
Extended European Search Report dated Jun. 10, 2015.

* cited by examiner

METHOD AND APPARATUS FOR PILOT POWER ALLOCATION IN A MULTI ANTENNA COMMUNICATION SYSTEM

TECHNICAL FIELD

Embodiments herein relate generally to a base station and a method in the base station, and to a network node and a method in the network node. More particularly the embodiments herein relate to determining adjustment of common pilot power in a four-way transmit (4Tx) antenna communications system.

BACKGROUND

In a typical cellular network, also referred to as a wireless communications system or communications system, User equipments (UEs), communicate via a Radio Access Network (RAN) to one or more Core Networks (CNs).

A user equipment is a mobile terminal by which a subscriber may access services offered by an operator's core network and services outside the operator's network to which the operator's radio access network and core network provide access. The user equipments may be for example communication devices such as mobile telephones, cellular telephones, smart phones, tablet computers or laptops with wireless capability. The user equipments may be portable, pocket-storable, hand-held, computer-comprised, or vehicle-mounted mobile devices, enabled to communicate voice and/or data, via the radio access network, with another entity, such as another mobile station or a server. User equipments are enabled to communicate wirelessly in the network. The communication may be performed e.g. between two user equipments, between a user equipment and a regular telephone and/or between the user equipment and a server via the radio access network and possibly one or more core networks, comprised within the communications system.

The radio access network covers a geographical area which is divided into cell areas, with each cell area being served by a Base Station (BS), e.g. a Radio Base Station (RBS), which in some radio access networks is also called evolved NodeB (eNB), NodeB or B node. A cell is a geographical area where radio coverage is provided by the radio base station at a base station site. Each cell is identified by an identity within the local radio area, which is broadcast in the cell. The base station communicates over an air interface operating on radio frequencies with the user equipment(s) within range of the base station.

Standardised by the third Generation Partnership Project (3GPP), High Speed Downlink Packet Access (HSPA) supports the provision of voice services in combination with mobile broadband data services. HSPA comprises High Speed Downlink Packet Access (HSDPA), High Speed Uplink Packet Access (HSUPA) and HSPA+. HSDPA allows networks based on the Universal Mobile Telecommunications System (UMTS) to have higher data transfer speeds and capacity. In HSDPA, a new transport layer channel, High Speed-Downlink Shared CHannel (HS-DSCH), has been added to the UMTS release 5 and further specification. It is implemented by introducing three new physical layer channels: High Speed-Shared Control CHannel (HS-SCCH), uplink High Speed-Dedicated Physical Control CHannel (HS-DPCCH) and High Speed-Physical Downlink Shared CHannel (HS-PDSCH). The HS-SCCH informs the user equipment that data will be sent on the HS-DSCH, two slots ahead. The HS-DPCCH carries acknowledgment information and a current Channel Quality Indicator (CQI) of the user equipment. This value is then used by the base station to calculate how much data to send to the user equipments on the next transmission. The HS-PDSCH is the channel mapped to the above HS-DSCH transport channel that carries actual user data.

Multiple Input Multiple Output (MIMO) refers to any communications system with multiple antennas at the transmitter and receiver, and it is used to improve communication performance. The terms input and output refer to the radio channel carrying the signal, not to the devices having antennas. At the transmitter (Tx), multiple antennas may be used to mitigate the effects of fading via transmit diversity and to increase throughput via spatial division multiple access. At the receiver (Rx), multiple antennas may be used for receiver combining which provides diversity and combining gains. If multiple antennas are available at both the transmitter and receiver, then different data streams may be transmitted from each antenna with each data stream carrying different information but using the same frequency resources. For example, using two transmit antennas, one may transmit two separate data streams. At the receiver, multiple antennas are required to demodulate the data streams based on their spatial characteristics. In general, the minimum number of receiver antennas required is equal to the number of separate data streams. 4×4 MIMO, also referred to as four branch MIMO, may support up to four data streams.

Currently, a 4Tx MIMO transmissions scheme for HSDPA is discussed within 3GPP standardization. One fundamental issue is what pilot scheme to use when this feature is switched on. In HSDPA the pilot signals are used for (mainly) two things, first it is used as a phase reference when the data channel, e.g. HS-PDSCH, should be demodulated; secondly it is also used for estimating the Channel State Information (CSI) such as CQI and Precoder Matrix Indicator (PMI). The pilot signal may be a single frequency. CSI may be referred to as known channel properties of a communication link and describes how a signal propagates from the transmitter to the receiver. The CSI makes it possible to adapt transmissions to current channel conditions, which is important for achieving reliable communication with high data rates in a multi antenna communications system.

In general, most systems provide a downlink signal of a predetermined structure, referred to as the downlink pilot signal or downlink reference signal. The downlink pilot signal is transmitted from the base station with a constant power to the user equipment. The user equipment uses the received downlink pilot signal to estimate the instantaneous downlink channel conditions, which can be reported back to the base station. A Common PIlot CHannel (CPICH) is a channelization code used for transmission of the pilot signal. The common pilot channel comprises known data and is used as a reference for downlink channel estimation by all user equipments in the cell served by the base station. Unlike the downlink, where the common pilot signal is used, uplink transmissions originate from different locations. Therefore, a common pilot signal cannot be used in uplink transmissions. In uplink transmission, each user equipment must have a separate dedicated pilot signal. The dedicated pilot signal is carried on the Dedicated Physical Control CHannel (DPCCH)

For a four branch MIMO system, pilot signals are needed for two main functionalities; channel state information estimation through channel sounding where the channel rank, CQI and Precoding Channel Indicator (PCI) are estimated and channel estimation for demodulation purposes. The wireless device recommends the channel rank information to the base station. In order to support 4Tx MIMO transmissions new pilot signals need to be defined. For four branch MIMO the following two different approaches are possible:

Common pilot signals for both CSI estimation and channel estimation.

Common pilot signals for CSI estimation and dedicated pilot signals for channel estimation.

Either the common pilot signal scheme of today is expanded to support four transmission antennas (4Tx). In this case the same pilot signals may be used for both demodulation purposes as well as for CSI estimation. Alternatively, dedicated pilot signals may be defined for demodulation of the data channel. In addition to these, some sparse and/or low power common pilot signals are needed for CSI estimation. These common pilot signals are needed since dedicated pilots in general may not be used for CSI estimation. This since they only exists when data to a certain user equipment is scheduled, and CSI estimation should be done by all user equipments in the cell. Also, if the dedicated pilot signals are precoded, the user equipment may not use this for precoder estimation since they in general do not span the total channel subspace. The exception is when a full rank transmission occurs to a user equipment.

The two pilot signal schemes have their pros and cons, but in this disclosure the focus is on the case where only common pilot signals are defined for both demodulation and CSI estimation purposes.

The common pilot signal approach for CSI has been investigated, and the channel estimation option as well as an option with dedicated pilot signals along with common pilot signal solution used for estimation of the channel for CSI estimation. Code multiplexed dedicated pilot signals rather than time division multiplexed pilot signals should be considered in the evaluation for data demodulation.

In the following, the impact of introducing common pilot signals only solution is described, i.e. common pilot signals are used for channel estimation and used for both CQI estimation and data demodulation.

The main problem occurring when the number of pilot signals is expanded from one (or two) to four is that there is a negative impact on legacy user equipments. A legacy user equipment may be a user equipment which is old and which continues to be used, typically because it still functions for the user equipment's needs, even though newer technology or more efficient methods are available The main impact on system performance stem from the high rank interference that is spread in the system. It is well known that a receiver with N Rx antennas may suppress interference from N−1 sources, where N is a positive integer. Hence, a typical user equipment receiver with two Rx antennas may only suppress one interfering signal. When 2Tx MIMO was introduced this was seen as a main obstacle, and the solution was to reduce the power of the second pilot signal sent from the second transmit antenna. Normally, the second pilot signal is transmitted with 3 dB, i.e. half the power, of the primary common pilot signal. This would minimize the impact on legacy user equipments while keeping the quality of the channel estimates of the second channel on an acceptable level. When going to 4Tx transmissions this may be generalized so that the power of the third and fourth pilot signal is reduced even further to minimize the impact on legacy user equipments. However lowering the pilot power also means worse channel estimation performance and hence lower throughput.

In FIG. 1 the impact of additional common pilots on legacy user equipments is depicted. In FIG. 1, the site-to-site distance is 500 m and the user equipment speed is 3 km/h. The x-axis of FIG. 1 represents the cell throughput measured in Mbit/s and the y-axis represents the mean user equipment throughput measured in Mbits/s. The circled line illustrates a R99 user equipment implementing 4Tx and where the second, third and fourth pilot power is −13 dB. The starred line illustrates a R99 user equipment implementing 2Tx and where the second pilot signal is −13 dB. The triangle line illustrates a R99 user equipment implementing 1Tx. It is seen that adding one additional pilot to the 1Tx scenario, i.e. 2Tx, has some negative impact on a R99 user equipment even if the power of the second pilot is reduced by 3 dB. However when adding 3 additional pilots, i.e. 4Tx, the throughput is reduced by 50% even if the pilot power is reduced.

FIG. 2 shows the system level impact on a Release HSDPA system with two transmit antennas and two receive antennas due to additional pilot power for Release-7 MIMO user equipments. The x-axis of FIG. 2 represents the number of user equipments per sector. The y-axis represents the sector throughput measured in Mbps. The squared line represents the third and fourth pilot power equals −13 dB. The circled line represents 2×2 MIMO only. It may be observed from FIG. 2 that due to additional pilot power there is a loss in throughput due to additional interference. The loss is significant at higher load. From this it is clear that in order to keep the impact on a reasonable level, the pilot power need to be reduced much more than 3 dB. This will, on the other hand have a negative impact on the MIMO user equipment since the channel estimates for the additional antennas will be very poor. This would mean that the throughput of this user equipment will be severely reduced.

SUMMARY

An object of embodiments herein is therefore to obviate at least one of the above disadvantages and to provide improved system throughput in a communications network.

According to a first aspect, the object is achieved by a method in a base station for determining adjustment of common pilot power in a four-way transmit antenna communications system. The base station comprises a first transmit antenna, a second transmit antenna, a third transmit antenna and a fourth transmit antenna. The base station identifies a set of scheduled user equipments in the communications system. The base station determines that the common pilot power should be adjusted based on a criterion associated with the set of scheduled user equipments.

According to a second aspect, the object is achieved by a method in a network node for adjusting common pilot power in a four-way transmit antenna communications system. The network node receives instructions from a base station to adjust the common pilot power based on a criterion associated with a set of scheduled user equipments. The base station comprises a first transmit antenna, a second transmit antenna, a third transmit antenna and a fourth transmit antenna. The network node adjusts the common pilot power for the third transmit antenna and the fourth transmit antenna of the base station based on the received instructions.

According to a third aspect, the object is achieved by a base station for determining adjustment of common pilot power in a four-way transmit antenna communications system. The base station comprises a first transmit antenna, a second transmit antenna, a third transmit antenna and a fourth transmit antenna. The base station further comprises an identifying unit which is configured to identify a set of scheduled user equipment's in the communications system. The base station comprises a processor which is configured to determine that the common pilot power should be adjusted based on a criterion associated with the set of scheduled user equipments.

According to a fourth aspect, the object is achieved by a network node for adjusting common pilot power in a four-way transmit antenna wireless communications system. The network node comprises a receiver which is configured to receive instructions from a base station to adjust the common pilot power based on a criterion associated with a set of scheduled user equipments. The base station comprises a first transmit antenna, a second transmit antenna, a third transmit antenna and a fourth transmit antenna. The network node comprises an adjusting unit which is configured to adjust the common pilot power for the third transmit antenna and the fourth transmit antenna of the base station based on the received instructions.

Since the pilot power is adjusted, improved system throughput in the communications network is provided.

Embodiments herein afford many advantages, of which a non-exhaustive list of examples follows:

An advantage of the embodiments herein is that when the common pilot power for the third transmit antenna and the fourth transmit antenna of the base station is adjusted, e.g. reduced, the impact of legacy user equipments which are not able to suppress high rank interference is kept on a reasonable level. Based on this, the communications system supports a wider range of 4Tx MIMO capability for user equipments. When the common pilot power for the third transmit antenna and the fourth transmit antenna of the base station is adjusted, e.g. increased, when the number of user equipment's configured with 4Tx MIMO reaches the threshold high power pilots can be provided to the user equipment as an aid for data detection.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

DETAILED DESCRIPTION

The embodiments herein describe allocation of pilot power based on the user equipment activity while keeping the acceptable performance for both legacy as well as the four branch MIMO user equipment.

Figure 1:
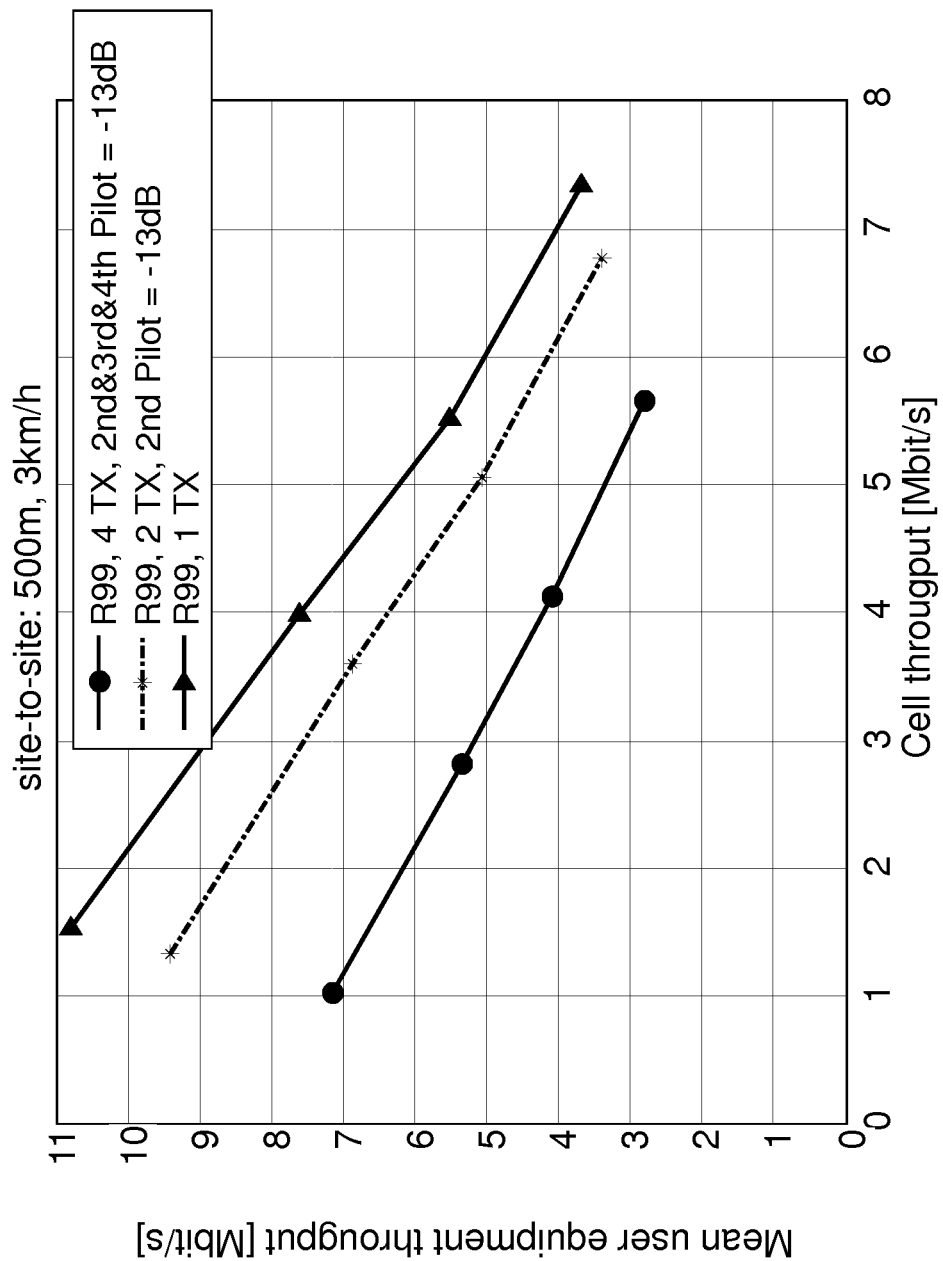
FIG. 1 is a graph illustrating the impact of additional pilots on legacy user equipments.
Figure 2:
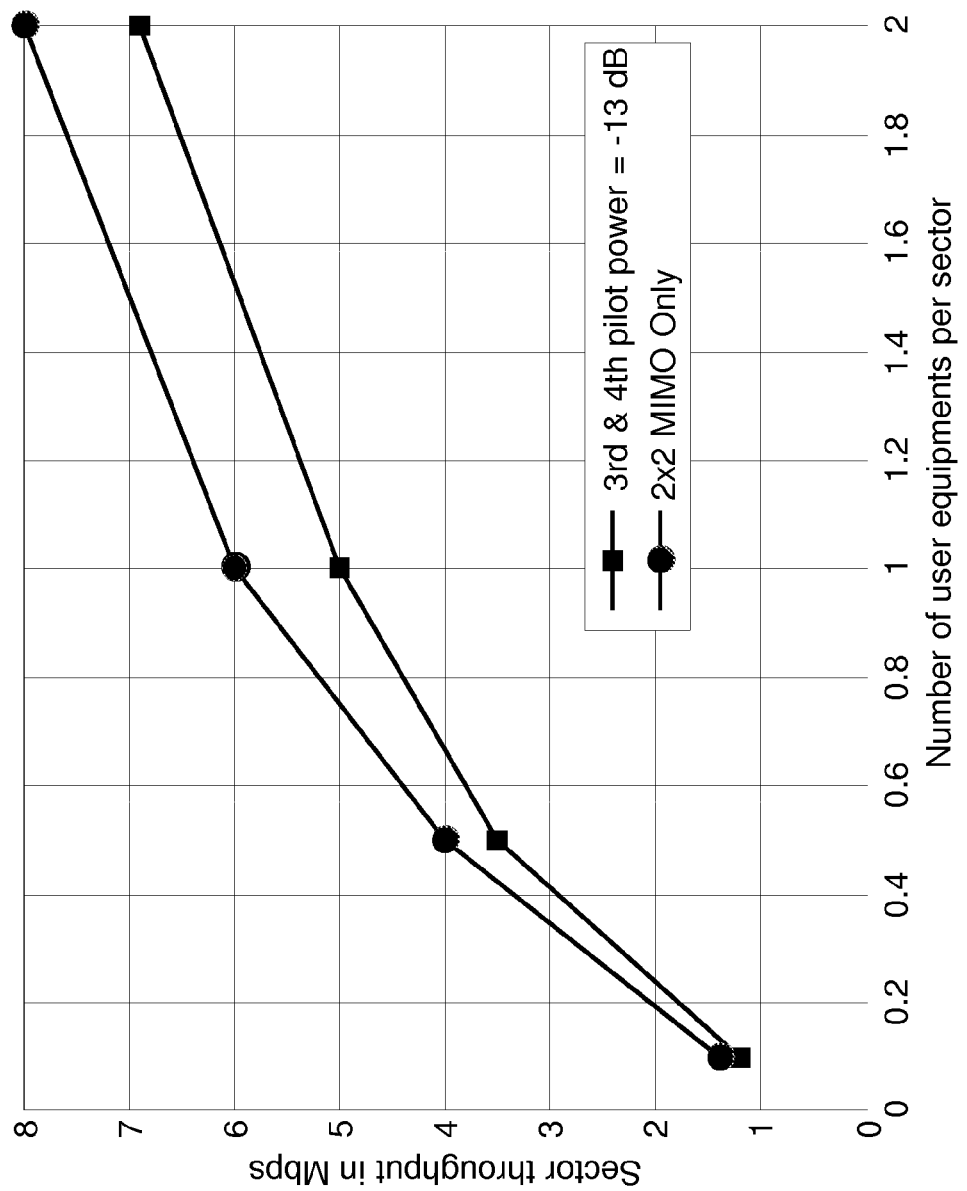
FIG. 2 is a graph illustrating system level throughput impact due to additional pilot power on a two antenna system for Release-7 MIMO user equipments.
Figure 3:
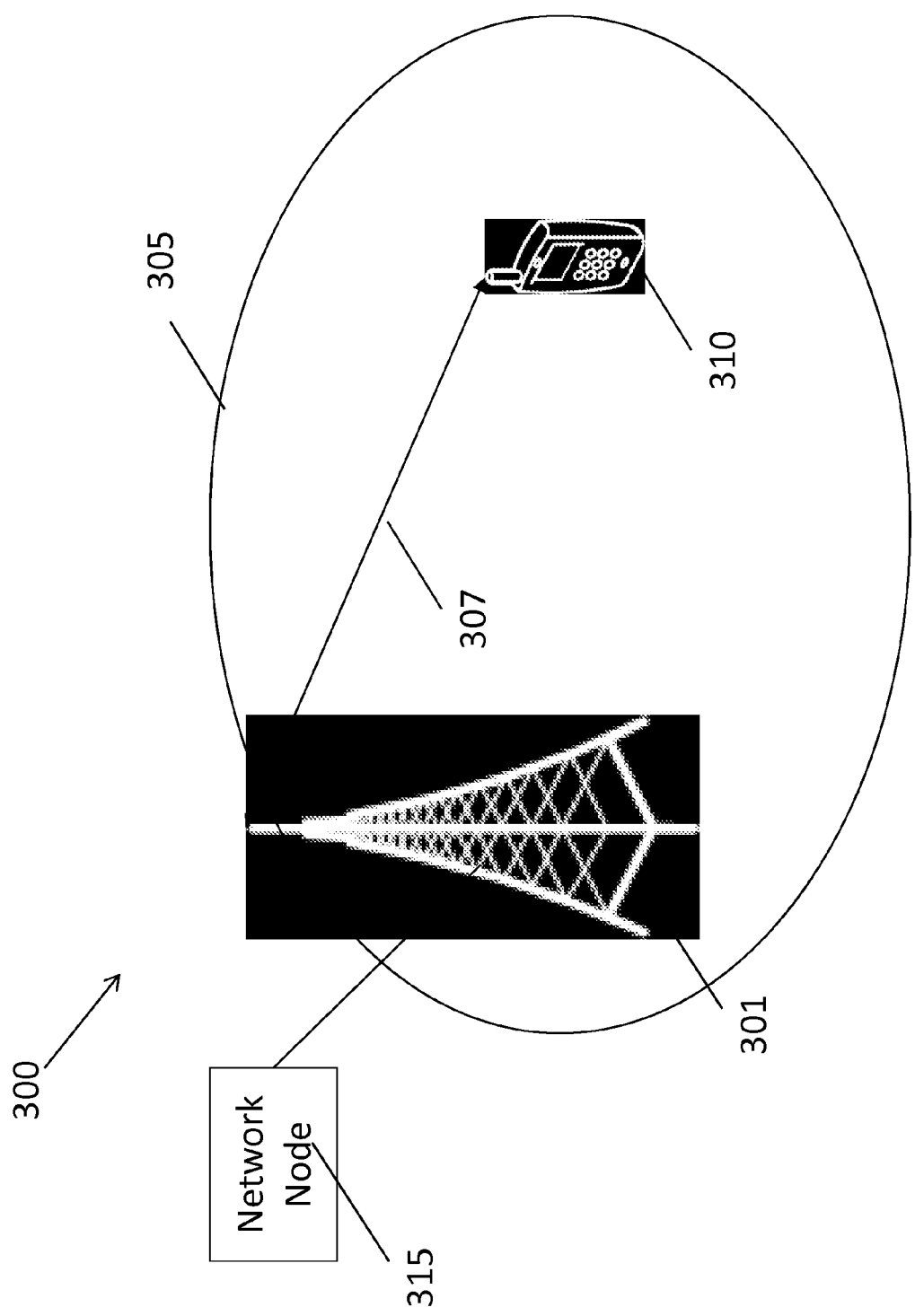
FIG. 3 is a schematic drawing illustrating an embodiment of a communications system.

FIG. 3 depicts a communications system 300 in which embodiments herein may be implemented. The communications system 300 may in some embodiments apply to a radio access technology such as for example HSDPA, Long Term Evolution (LTE), LTE Advanced, Wideband Code Division Multiple Access (WCDMA), Global System for Mobile Communications (GSM), any other Third Generation Partnership Project (3GPP) radio access technology or other radio access technologies such as WLAN. The communications system 300 may also be referred to as a wireless communications system. The communications system 300 is a four-way transmit antenna communications system.

The communications system 300 comprises a base station 301 serving a cell 305. The base station 301 may be a base station such as a NodeB, an eNodeB, or any other network unit capable to communicate over a radio carrier 307 with a user equipment 310 being present in the cell 305. The base station 301 comprises a first transmit antenna 1201, a second transmit antenna 1202, a third transmit antenna 1203 and a fourth transmit antenna 1204. The transmit antennas are not illustrated in FIG. 3, but they will be described in more detail with reference to FIG. 12 below. The reference numbers 1201, 1202, 1203 and 1204 refer to FIG. 12. The radio carrier 307 may be a single downlink carrier or a multi-carrier.

The user equipment 310 may be any suitable communication device or computational device with communication capabilities capable to communicate with the base station 301 over the radio channel 307, for instance but not limited to mobile phone, smart phone, Personal Digital Assistant (PDA), tablet computer, laptop, MP3 player or portable Digital Versatile Disc (DVD) player or similar media content devices, digital camera, or even stationary devices such as a Personal Computer (PC). A PC may also be connected via a mobile station as the end station of the broadcast/multicast media. The user equipment 310 may also be an embedded communication device in e.g. electronic photo frames, cardiac surveillance equipment, intrusion or other surveillance equipment, weather data monitoring systems, vehicle, car or transport communication equipment, appliances etc. The user equipment 310 is referred to as UE in some of the figures.

In some versions of the radio access network, several base stations 301 are typically connected, e.g. by landlines or microwave, to a network node 315. The network node 315 may be a Radio Network Controller (RNC) which supervises and coordinates various activities of the plural base stations 301 connected thereto. Note that only one base station 301 is shown in FIG. 3 for the sake of simplicity.

Figure 4A:
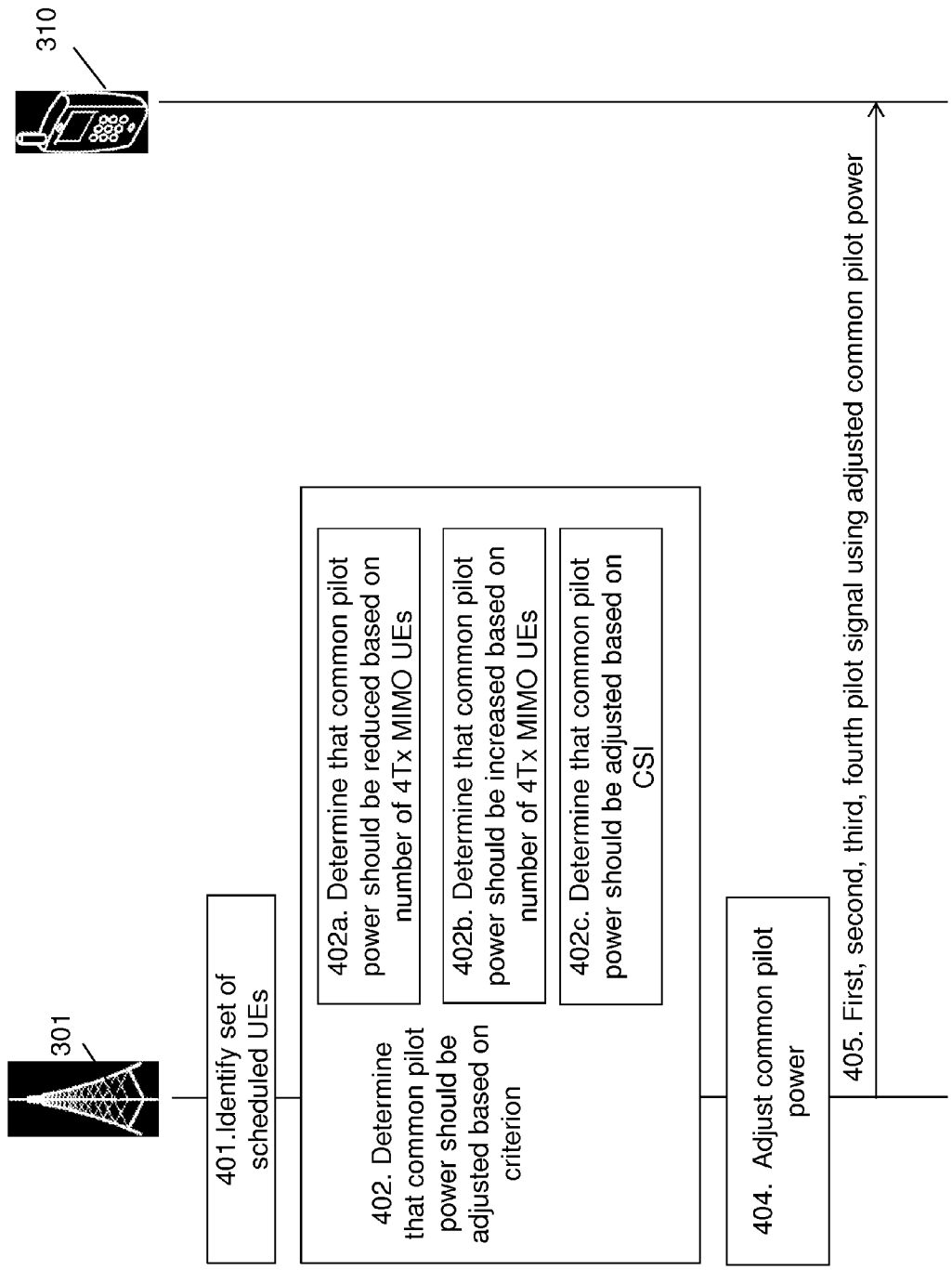
FIG. 4a-b are signalling diagrams illustrating embodiments of a method in a communications system.
Figure 4B:
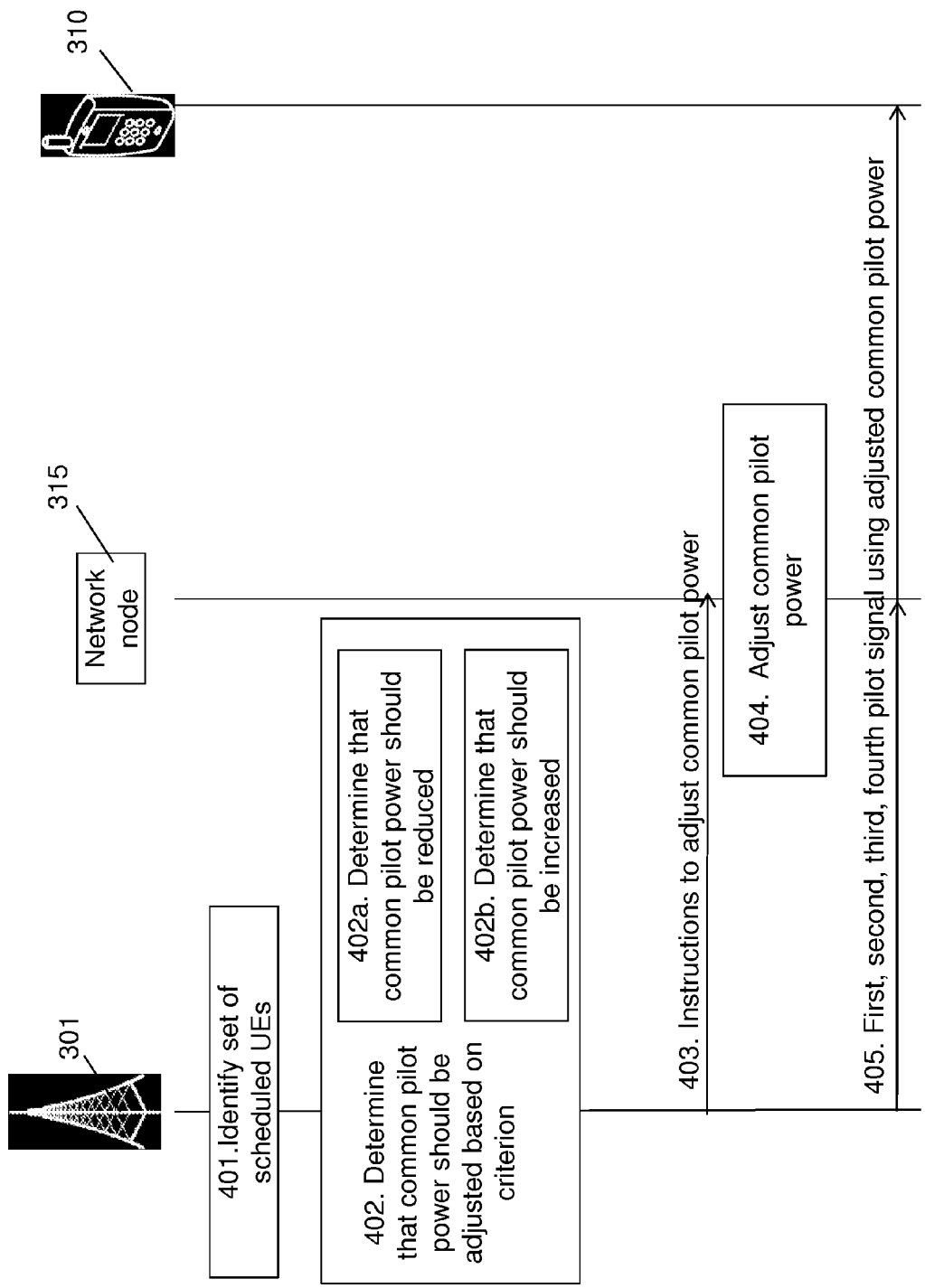

The method for determining adjustment of common pilot power, according to some embodiments will now be described with reference to the signalling diagram depicted in FIGS. 4a and 4b. FIG. 4a illustrates the case when the base station 301 is the node which adjusts the common pilot power and FIG. 4b illustrates the case when the network node 315 is the node which adjusts the common pilot power. As mentioned above, the base station 301 comprises a first transmit antenna 1201, a second transmit antenna 1202, a third transmit antenna 1203 and a fourth transmit antenna 1204. The base station 301 is connected to the user equipment 310 via the radio carrier 307. In some embodiments, the radio carrier 307 is a single downlink carrier or a multi-carrier. In some embodiments, the communications system 300 is a HSDPA system.

The method comprises the following steps, which steps may be performed in any suitable order:

Step 401

This step is shown in FIGS. 4a and 4b. The base station 301 identifies a set of scheduled user equipments 310 in the communications system 300. The scheduled user equipments 310 are located in the cell 305 that the base station 301 serves. The base station 301 uses any suitable technique to identify the set of scheduled user equipments 310.

Step 402

This step is shown in FIGS. 4a and 4b. The base station determines that the common pilot power should be adjusted based on a criterion associated with the set of scheduled user equipments 310. The criterion represents at least one of a CSI estimate associated with the set of currently scheduled user equipments 310 and a number of currently scheduled user equipments 310 configured with 4Tx MIMO in the set of scheduled user equipments 310.

In some embodiments, the common pilot power is determined to be increased at start of the HS-SCCH transmission.

The criterion may be seen as a capability of the set of scheduled user equipments 310, where the capability may be e.g. the 4Tx MIMO capability.

Step 402a

This step is shown in FIGS. 4a and 4b and is a substep of step 402. This step relates to when the criterion represents a number of scheduled user equipments 310 configured with 4Tx MIMO.

In some embodiments, when the number of scheduled user equipments 310 configured with 4Tx MIMO is zero, i.e. when no scheduled user equipments are configured with Tx, the base station 301 determines that the common pilot power should be reduced for the third transmit antenna 1203 and the fourth transmit antenna 1204. The reduction may be seen as keeping the common pilot power to a minimum level. It may be possible to set the power to e.g. 6-10 dB below the primary CPICH.

Step 402b

This step is shown in FIGS. 4a and 4b and is a substep of step 402. This step relates to when the criterion represents a number of scheduled user equipments 310 configured with 4Tx MIMO.

In some embodiments, when the number of scheduled user equipment 310 configured with 4Tx MIMO is above a threshold, the base station 301 determines that the common pilot power for the third transmit antenna 1203 and the fourth transmit antenna 1204 should be increased. Compared to 2×2 MIMO, it is the power on the additional antennas, i.e. the third transmit antenna 1203 and the fourth transmit antenna 104, which is increased so that the demodulation performance of the data is secured. In this case a reasonable pilot power may be in the order of 3 dB below the primary CPICH. The threshold may a positive integer from 1 and above. The threshold may be predefined in the base station 301, or the threshold may be a dynamic threshold that may change during operation. The threshold may be received by the base station 301 from any suitable other node in the communications system 300.

Step 402c

This step is shown in FIGS. 4a and 4b and is a substep of step 402. This step relates to when the criterion represents the CSI estimate associated with the set of scheduled user equipments 310. In some embodiments, the base station 301 determines that the common pilot power for the third transmit antenna 1203 and the fourth transmit antenna 1204 should be adjusted, i.e. reduced or increased, so that the CSI estimates are of reasonable quality. The common pilot power is then dependent on the activity in the cell 305, i.e. the quality of the CSI estimate. A reasonable quality for CSI estimate may be for example if the throughput is not impacted even if the pilot powers are reduced to −19 dB.

One or more of the steps 402a, 402b and 403c may be performed.

Step 403

This step is shown in FIG. 4b. In some embodiments, the base station 301 transmits instructions to the network node 315 to adjust the common pilot power. The base station 301 performs this transmission when it has determined that the pilot power should be adjusted.

Step 404

This step is shown in FIGS. 4a and 4b. In some embodiments, the base station 301 or the network node 315 adjusts the common pilot power for the third transmit antenna 1203 and the fourth transmit antenna 1204 based on the determination in step 402.

In some embodiments, the pilot power for the first transmit antenna 1201 and/or the second transmit antenna 1202 may also be adjusted.

The power allocation scheme may be further refined by considering also the downlink control channel associated with HSDPA. It is noted that the HS-SCCH is time staggered compared to the data transmission on the HS-PDSCH. The HS-SCCH, which comprises information needed to receive the data channel, is transmitted two slots in advanced to the data channel HS-PDSCH.

Since the user equipment 310 may gain by averaging the channel estimates over some time; it may be beneficial if the pilot power was adjusted some time before the data transmission occur. Especially at low speeds, e.g. in low Doppler scenarios, there may be a large gain, and this may be a scenario for the high data rates provided by a 4Tx MIMO scheme.

The common pilot power may then be adjusted at the start of the HS-SCCH transmission. In this case the benefit is twofold. Higher pilot power and hence better channel estimates may be provided for the detection of the HS-SCCH, and also the user equipment 310 will have time to average the channel estimates until the start of the HS-PDSCH transmission.

Adjusting the pilot power for the third transmit antenna 1203 and the fourth transmit antenna 1204 mitigates the problem of legacy user equipments having trouble suppressing high rank interference.

Step 405

This step is shown in FIGS. 4a and 4b. In some embodiments, the base station 301 transmits a first pilot signal, a second pilot signal, a third pilot signal and a fourth pilot signal to the user equipment 310 using the adjusted common pilot power for the third transmit antenna 1203 and the fourth transmit antenna 1204. In some embodiments, the base station 301 transmits these four pilot signals via the network node 315, as seen in FIG. 4b.

In some embodiments, the base station 301 transmits the first pilot signal, the second pilot signal, the third pilot signal and the fourth pilot signal to the user equipment 310 using the reduced common pilot power or the increased common pilot power, possibly via the network node 315.

For a two branch Release-7 MIMO, the Secondary Common Pilot CHannel (S-CPICH) is often configured in addition to the Primary Common Pilot CHannel (P-CPICH) for channel sounding whenever the user equipment 310 is 2×2 MIMO capable. Both P-CPICH and S-CPICH are used for estimating the channel for computing the CQI as well as for data demodulation. If the same design principles are followed for four branch MIMO, four pilot signals are needed for computing channel state information and data demodulation. Unfortunately, introducing new common pilots causes pilot interference to the other cell users and degrades the overall system performance. As mentioned above, one solution to avoid this problem is to reduce the pilot power of the additional pilot signals. Reduction in pilot power might impact the link throughput of the four branch MIMO capable user equipment 310.

In the following, the performance impact on link throughput due to reduction in pilot powers for the third transmit antenna 1203 and the fourth transmit antenna 1204 is analysed. The following three cases for link throughput performance evaluation are considered:

Impact of third and fourth pilot power levels on the link performance with ideal estimation for both CSI and data demodulation.

Impact of third and fourth pilot power levels on the link performance with realistic channel estimation for both CSI and data demodulation.

Impact of third and fourth pilot power levels on link performance with realistic channel estimation for CSI estimation and with perfect channel estimation with data demodulation.

A 4×4 MIMO communications system with four codewords is considered with link adaptation, where the rank information, PCI, modulation, coding rate and the transport block size are dynamically updated for each Transmission Time Interval (TTI). It is assumed that the precoding codebook is based on LTE Release 8. A TTI defines duration of a transmission on the radio link. A TTI may be of different lengths such as e.g. 2 ms, 10 ms and 20 ms.

Some simulations will now be described where a realistic channel estimation with different pilot powers for third and fourth pilot signals is used. The values for P-CPICH and S-CPICH are set to −10 dB and −13 dB respectively. Furthermore, uncorrelated fading at both the transmit and receive side is assumed. For link adaptation, the user equipment 310 chooses the PCI, Rank Indicator (RI) and Modulation and Coding Scheme (MCS) based on maximization of Shannon capacity with realistic channel estimates. The feedback is assumed to have 3 TTI delays and is assumed to be error free. The simulations are run for a user equipment 310 with different geometry factors and the wireless channel assumed is Pedestrian A channel. The velocity of the user equipment 310 is assumed to be 3 Kmph.

Figure 5:
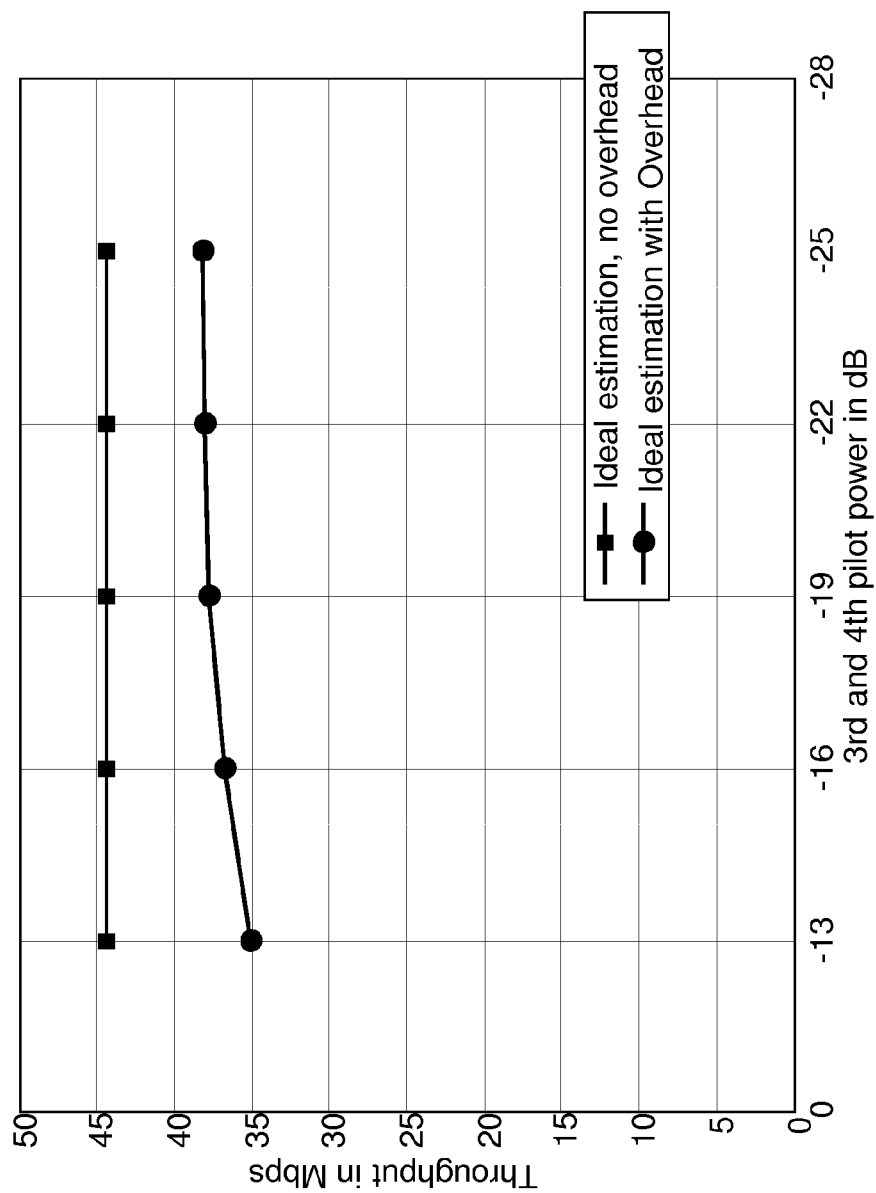
FIG. 5 is a graph illustrating simulations of link level throughput with different pilot power reduction for the third and fourth antennas.

An ideal channel estimation for both channel sounding and data demodulation is now considered. FIG. 5 shows the link level throughput with different pilot power reduction for the third transmit antenna 1203 and the fourth transmit antenna 1204 with ideal channel estimation for CQI computation and also for data demodulation. The x-axis of FIG. 5 represents the third and fourth pilot power measured in dB. The y-axis of FIG. 5 represents the throughput measured in Mbps. The geometry is set to 20 dB. The throughput is plotted without any overhead. Note that the power levels of P-CPICH and S-CPICH are set to −10 dB and −13 dB respectively. The squared line represents an ideal estimation without any overhead. The circled line represents an ideal estimation with overhead. It may be observed from FIG. 5 that as the pilot power is reduced further, the performance is better due to available power for HS-PDSCH. This result is useful as it shows the throughput achievable with reduced power levels on third and fourth antennas.

Figure 6:
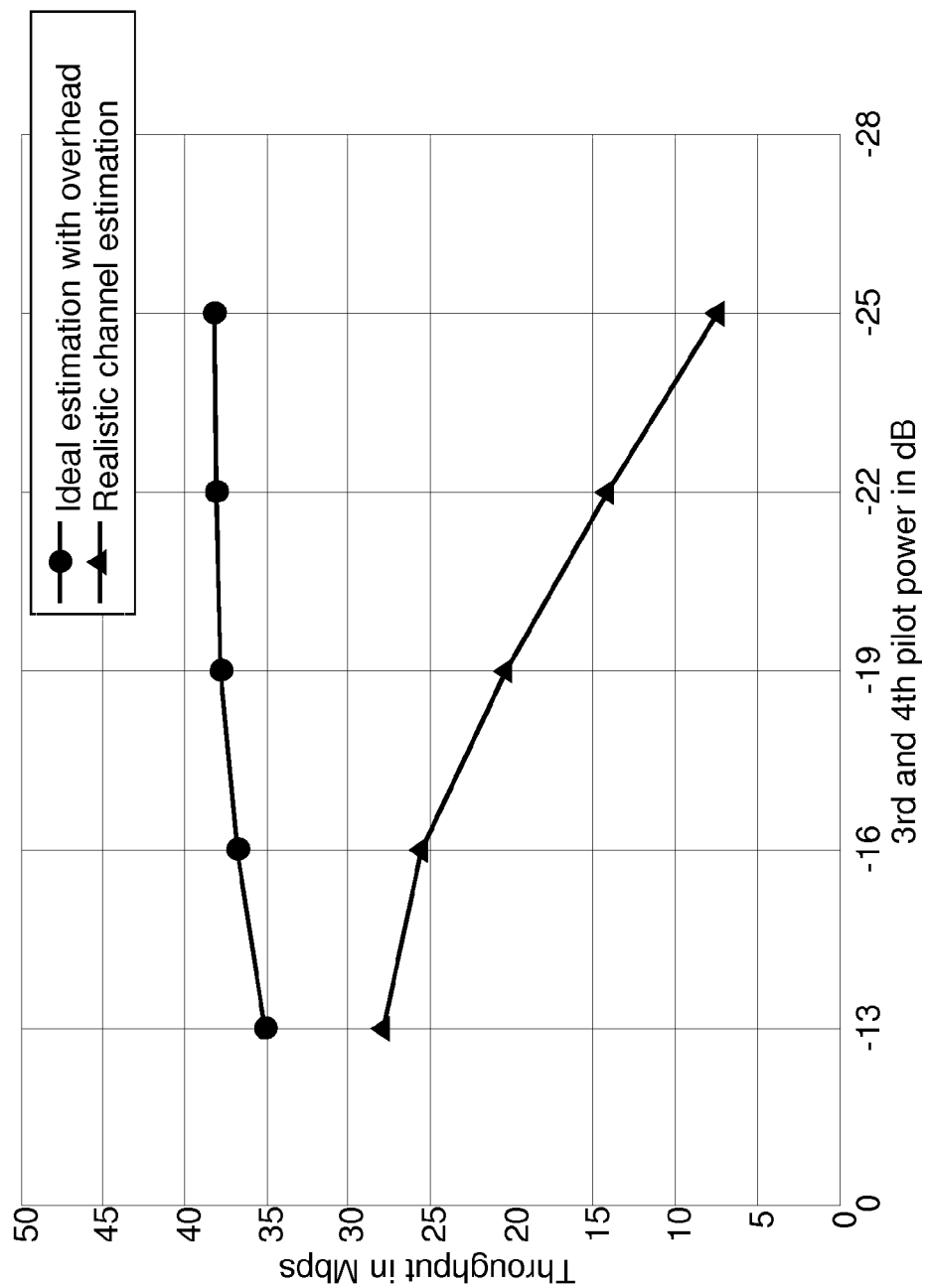
FIG. 6 is a graph illustrating link throughput performance with realistic channel estimation at geometry=20 dB.

A realistic channel estimation for both channel sounding and data demodulation will now be described. FIG. 6 shows the link level throughput at geometry=20 dB with different pilot power reduction for the third transmit antenna 1203 and the fourth transmit antenna 1204 and with realistic channel estimation for both channel sounding and data demodulation. The x-axis of FIG. 6 represents the third and fourth pilot power measured in dB. The y-axis of FIG. 6 represents the throughput measured in Mbps. The circled line represents an ideal estimation with overhead. The triangle line represents a realistic channel estimation. It may be observed that as the pilot power is reduced the performance degrades due to bad channel estimation.

Figure 7:
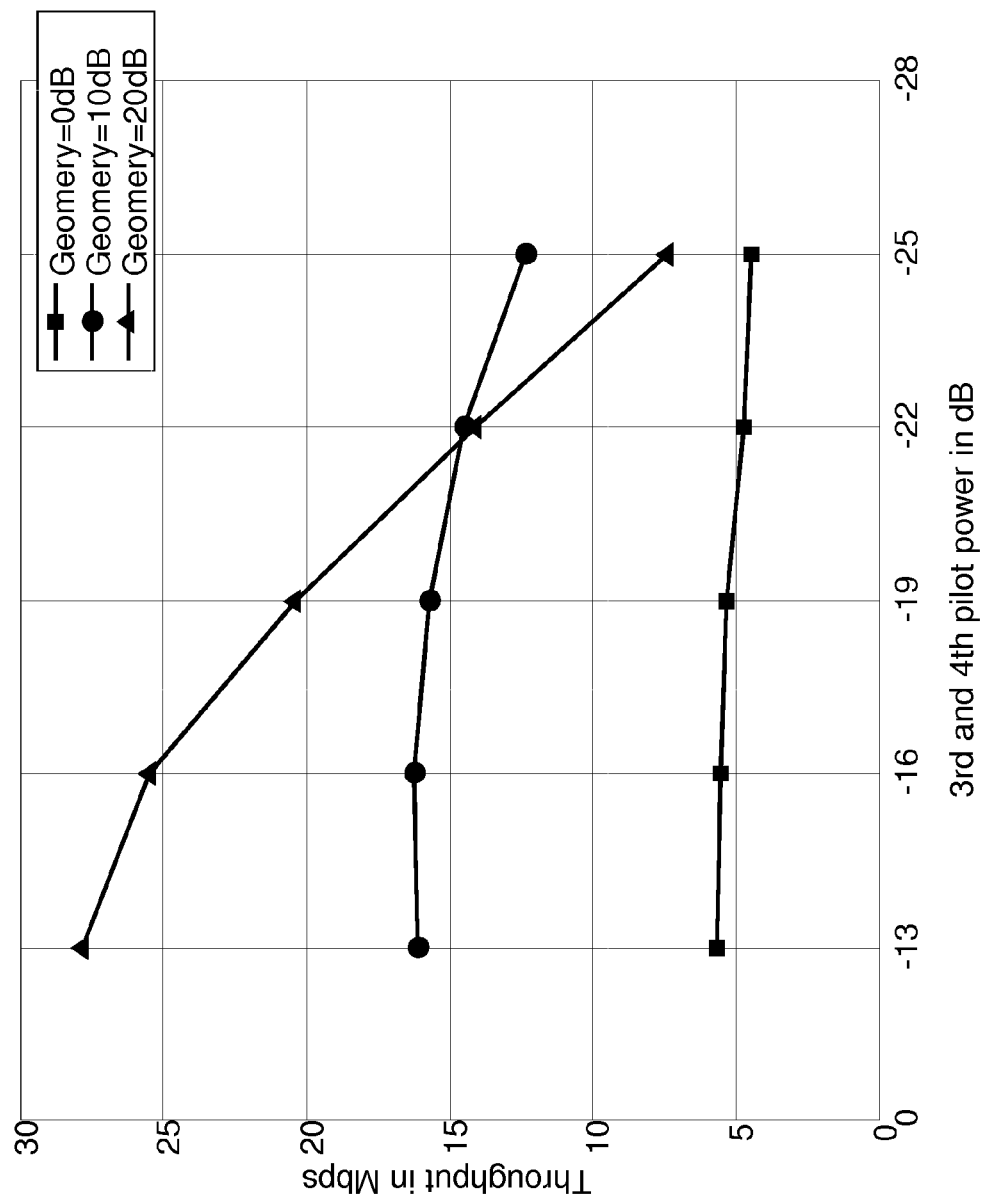
FIG. 7 is a graph illustrating link throughput performance for three different geometries.

FIG. 7 shows the link throughput performance for three different geometries. It may also be seen as link level throughput for the user equipment 310 with three different Signal to Noise Ratio (SNR). The x-axis of FIG. 7 represents the pilot power for the third transmit antenna 1203 and the fourth transmit antenna 1204 measured in dB. The y-axis of FIG. 7 represents the throughput measured in Mbps. The squared line represents the geometry=0 dB. The circled line represents geometry=10 dB. The triangle line represents the geometry=20 dB. The performance with reduced pilot powers for third transmit antenna 1203 and the fourth transmit antenna 1204 while keeping the pilot powers for the first transmit antenna 1201 and the second transmit antenna 1202 as −10 and −13 dB respectively is plotted. FIG. 7 shows that reduced pilot powers leads to degraded performance due to bad channel estimation for CQI and data demodulation. The degradation is severe at a high SNR region compared to a low SNR region. This is because at high SNR, there is a high probability of rank three and rank four transmissions. A high SNR may be for example 20 dB or higher and a low SNR may be less than 5 dB. Rank three and rank four transmission refers to the actually transmitted number of streams. It may be observed that for all the geometries in FIG. 7, the link throughput performance reduces with reduction in pilot power for third transmit antenna 1203 and the fourth transmit antenna 1204. At low geometries, e.g. 0 dB, the performance degradation is very minimal, while the degradation is severe at high geometries, e.g. 20 dB. For example, at −19 dB pilot power the link throughput is reduced by 46% as compared to the base line of ideal estimation with pilot overhead. This is because at high geometries the probability of rank three and rank four transmissions is very high, and because the data throughput is reduced by poor channel estimates. At low and medium geometries, e.g. 10 dB, the probability of rank one and rank two transmissions is high and the impact is much lower.

Table 1 below gives an overview of the performance degradation due to reduced pilot powers.

TABLE 1

| Pilot power for third and fourth transmit antennas in dB | Performance loss with respect to ideal estimation with overhead in % | | |
|---|---|---|---|
| | Geometry = 0 dB | Geometry = 10 dB | Geometry = 20 dB |
| −13 | 6.57 | 8.61 | 20.75 |
| −16 | 13.23 | 10.77 | 30.63 |
| −19 | 15.77 | 15.76 | 46.04 |
| −22 | 26.01 | 23.05 | 62.82 |
| −25 | 31.28 | 35.05 | 80.62 |

The left most column in table 1 comprises five different values of the pilot power for the third and fourth transmit antennas measured dB. The remaining three columns represents the performance loss with respect to ideal estimation with overhead in % for a low geometry, medium geometry and high geometry. It may also be observed that if the pilot power of third and fourth pilot signals is reduced beyond −22 dB the performance at high geometries is even worse compared to the medium geometries.

Figure 8:
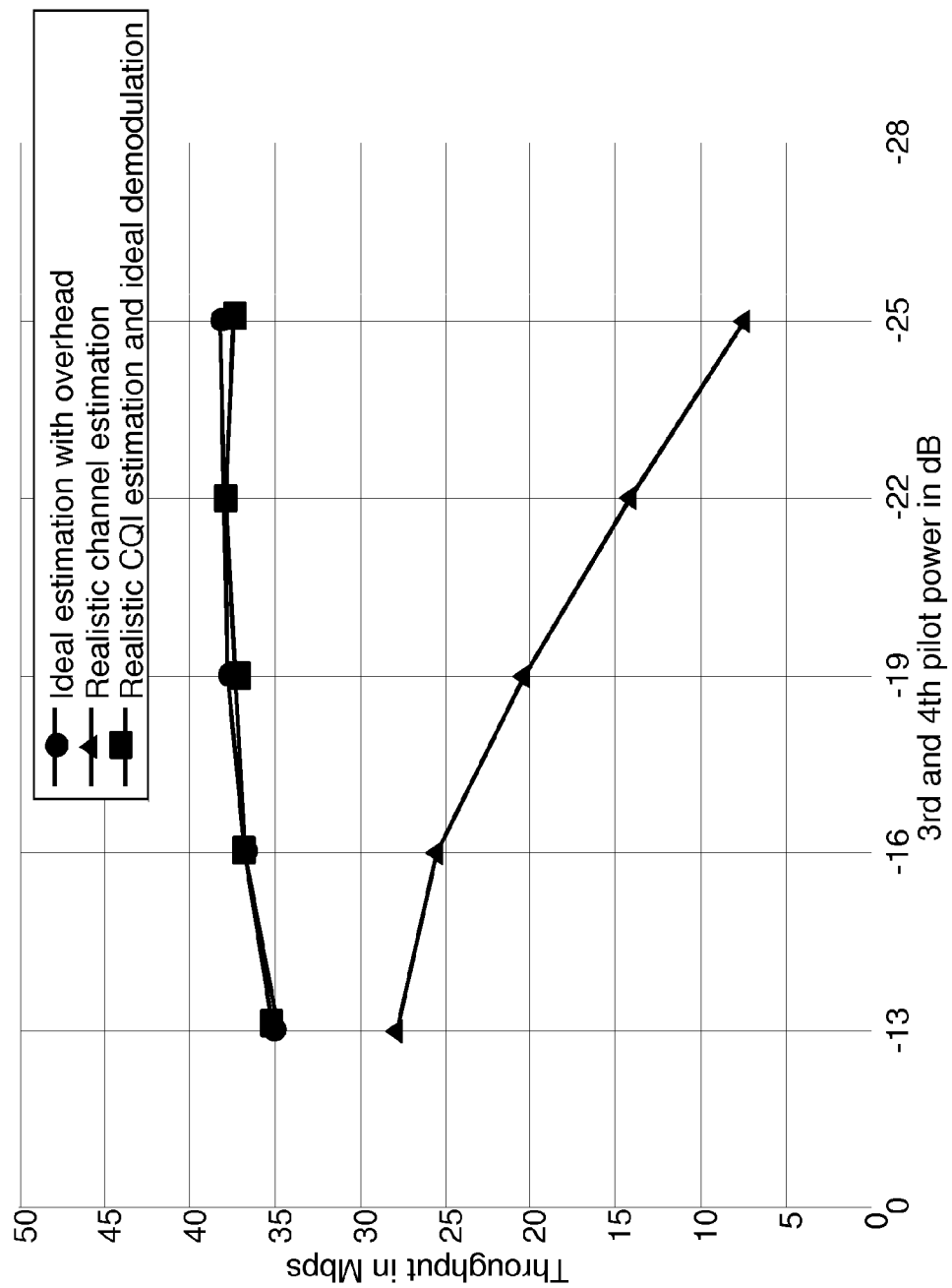
FIG. 8 is a graph illustrating link throughput performance with realistic channel estimation for channel sounding and perfect channel estimation for data demodulation.

A realistic channel estimation for channel sounding and perfect channel estimation for data demodulation will now be described. FIG. 8 shows the link throughput performance with realistic channel estimation for channel sounding and perfect channel estimation for data demodulation. The performance is showed due to perfect demodulation and imperfect channel due to reduced pilot powers. The x-axis of FIG. 8 represents the pilot power of the third transmit antenna 1203 and the fourth transmit antenna 1204 measured in dB. The y-axis of FIG. 8 represents the throughput measured in Mbps. The circled line represents an ideal estimation with overhead. The triangle line represents a realistic channel estimation. The squared line represents a realistic CQI estimation and ideal demodulation. The results were shown for a user equipment 310 with high geometry equal to 20 dB. It may be observed that the performance loss with realistic channel estimation for channel sounding is very small. The loss is less than 2% for even reduced power levels of −25 dB. It may also be observed that with realistic channel estimation the performance degrades with reduced power levels for the third transmit antenna 1203 and the fourth transmit antenna 1204. It may be observed that the performance due to imperfect channel estimates for CQI estimation has negligible impact with reduced pilot powers.

Figure 9:
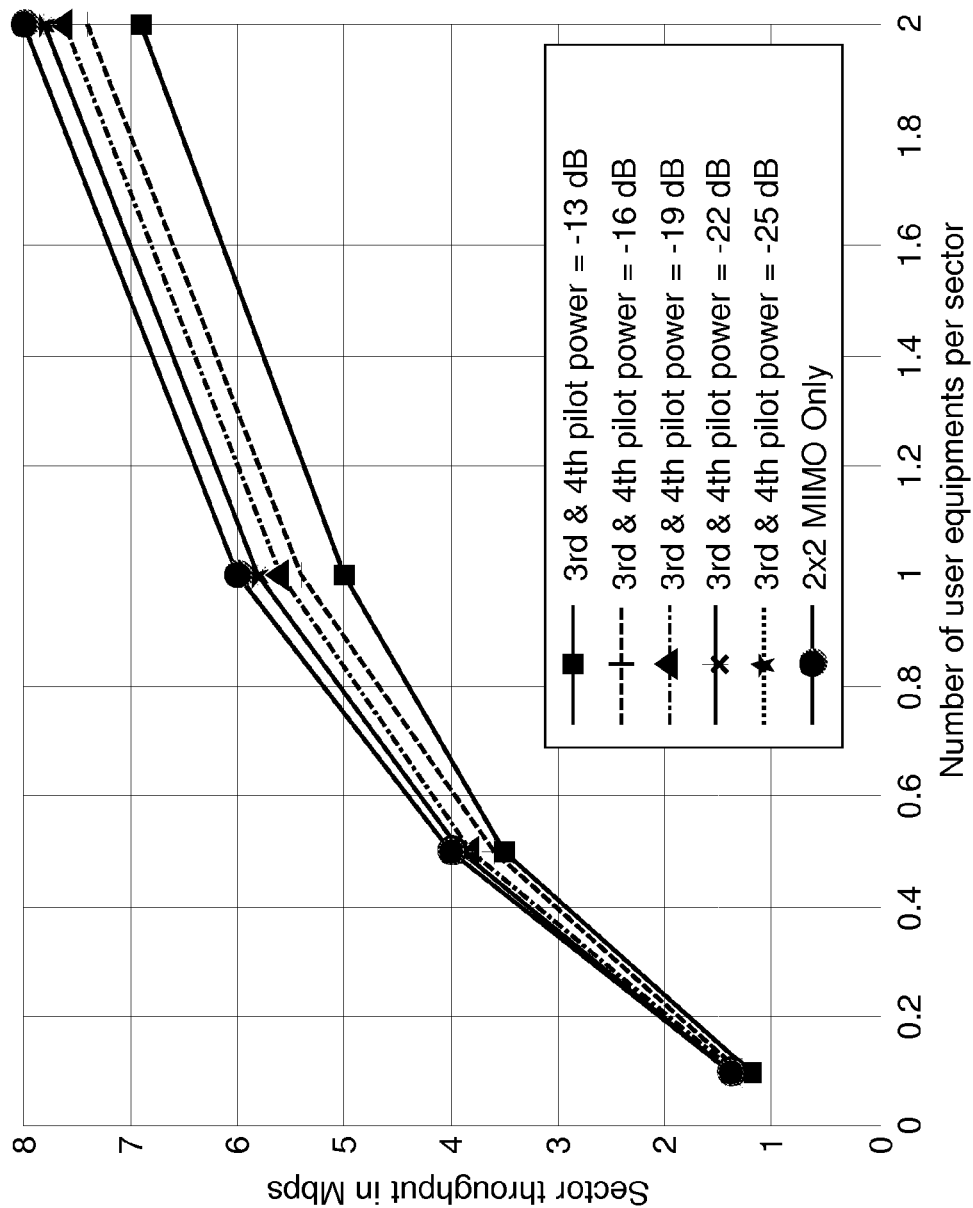
FIG. 9 is a graph illustrating performance of a pilot reduction scheme on the sector throughput with different number of users per sector.

System level simulations may be performed to study the impact on the legacy user equipments with 2×2 MIMO capable user equipments, i.e. Release 7. FIG. 9 shows the performance of a pilot reduction scheme on the sector/cell throughput with different number of user equipments per sector. The x-axis of FIG. 9 represents the number of user equipments 310 per sector. The y-axis of FIG. 9 represents sector throughput in Mbps. The squared line represents the pilot power=−13 dB for the third transmit antenna 1203 and the fourth transmit antenna 1204. The line with a horizontal dash represents pilot power=−16 dB for the third transmit antenna 1203 and the fourth transmit antenna 1204. The triangle line represents pilot power=−19 dB for the third transmit antenna 1203 and the fourth transmit antenna 1204. The line with a cross represents the pilot power=−22 dB for the third transmit antenna 1203 and the fourth transmit antenna 1204. The line with a star represents the pilot power=−25 dB for the third transmit antenna 1203 and the fourth transmit antenna 1204. The circled line represents 2×2 MIMO only. For this simulation, it is assumed that all the user equipments are Release 7 MIMO capable with two receive antennas. The additional interference due to third and fourth pilot signals is considered with different power levels. The pilot powers for the first transmit antenna 1201 and the second transmit antenna 1202 are set to −10 dB and −13 dB respectively. FIG. 8 shows the impact on system level performance for two transmit antennas with reduced pilot powers on the third transmit antenna 1203 and the fourth transmit antenna 1204. It may be observed that with reduced pilot powers the impact is less severe. At power level equal to −25 dB the impact due to additional pilots is almost negligible.

From FIG. 9, it may be observed that as the power of the additional pilot signals is decreased the impact on the system throughput performance is less. For example, if the pilot power is around −19 dB the impact on the legacy user equipments is almost negligible. Table 2 below summarizes the impact due to additional power on third and fourth pilot signals, i.e. the performance loss due to additional pilot signals on the system level. The left most column presents five different values of the pilot power for the third transmit antenna 1203 and the fourth transmit antenna 1204 measured in dB. The remaining columns presents the performance loss due to additional pilot signals, measured in % for four different numbers of user equipment's per sector.

TABLE 2

| Pilot power for third and fourth transmit antennas in dB | Performance loss due to additional pilots in % | | | |
|---|---|---|---|---|
| | Number of UEs = 0.1 per sector | Number of UEs = 0.5 per sector | Number of UEs = 1 per sector | Number of UEs = 2 per sector |
| −13 | 13.67 | 12.5 | 16.67 | 13.75 |
| −16 | 6.48 | 10.00 | 10.0 | 7.5 |
| −19 | 2.88 | 5.00 | 6.67 | 5.0 |
| −22 | 0.72 | 2.5 | 3.33 | 2.5 |
| −25 | 0.72 | 2.5 | 3.33 | 2.5 |

The above description illustrates the impact on link and system throughput due to the introduction of common pilot signal on the third transmit antenna 1203 and fourth transmit antenna 1204. From the system simulation results presented here it may be concluded that adding additional low power pilots to support 4Tx MIMO would give an acceptable degradation on legacy if the power is reduced to 19 dB. Since the reduction in pilot powers impacts the user equipment demodulation performance, the impact on demodulator performance by link level simulations has been studied. The conclusion may be that the impact at low geometries is marginal with the reduction in pilot power, while at high geometries, the impact may become severe. However, if perfect channel estimation is assumed for data demodulation, the impact is minimal for CSI estimation using realistic channel estimation. Hence, if dedicated pilot signals with sufficient power for data demodulation are introduced, reducing the power levels for the third transmit antenna 1203 and the fourth transmit antenna 1204 it will be a minimal impact on the link as well as system throughput. It is possible to adapt the amount of pilot resources used for CSI measurements.

Figure 10A:
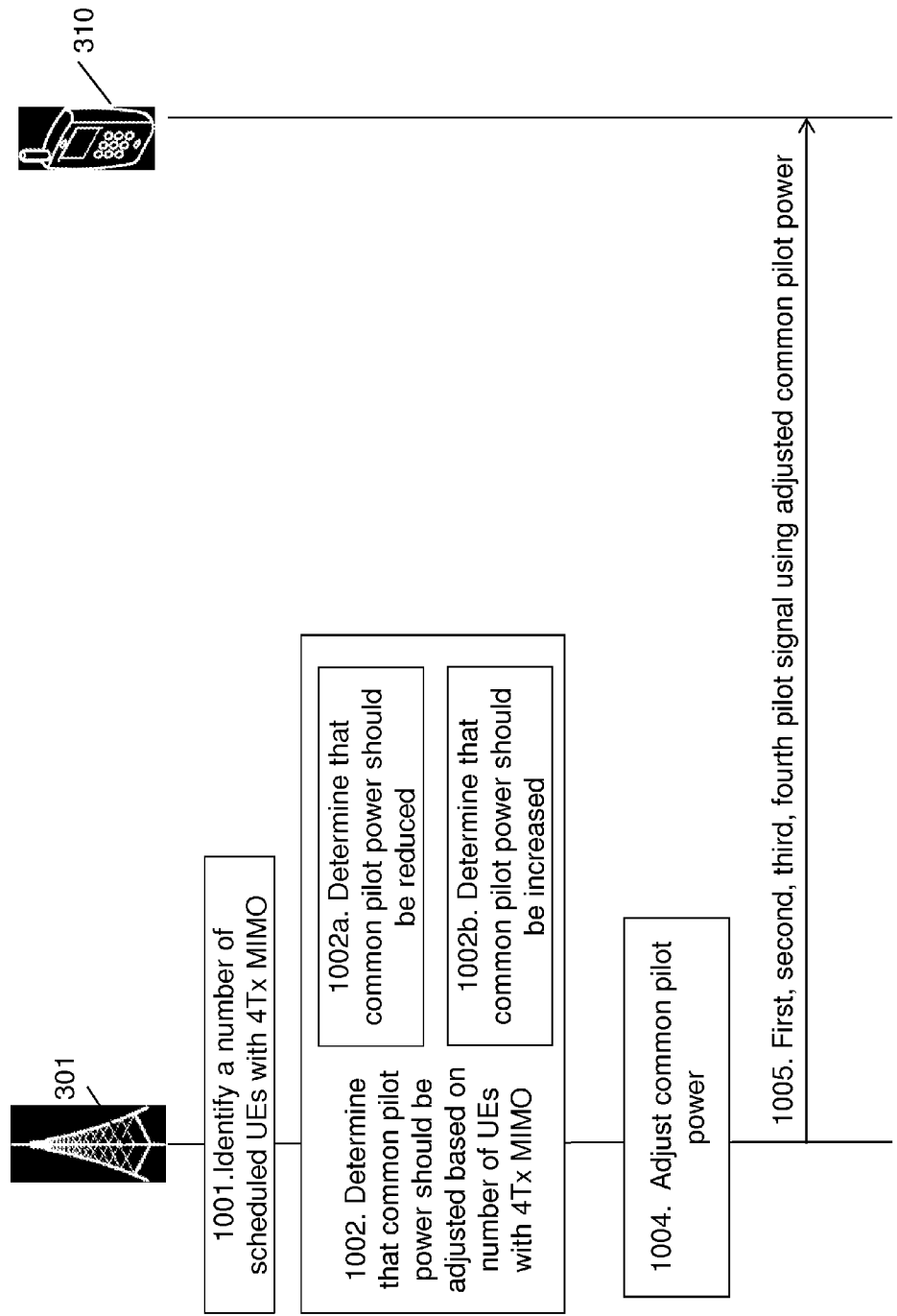
FIG. 10a-b are signalling diagrams illustrating embodiments of a method in a communications system.
Figure 10B:
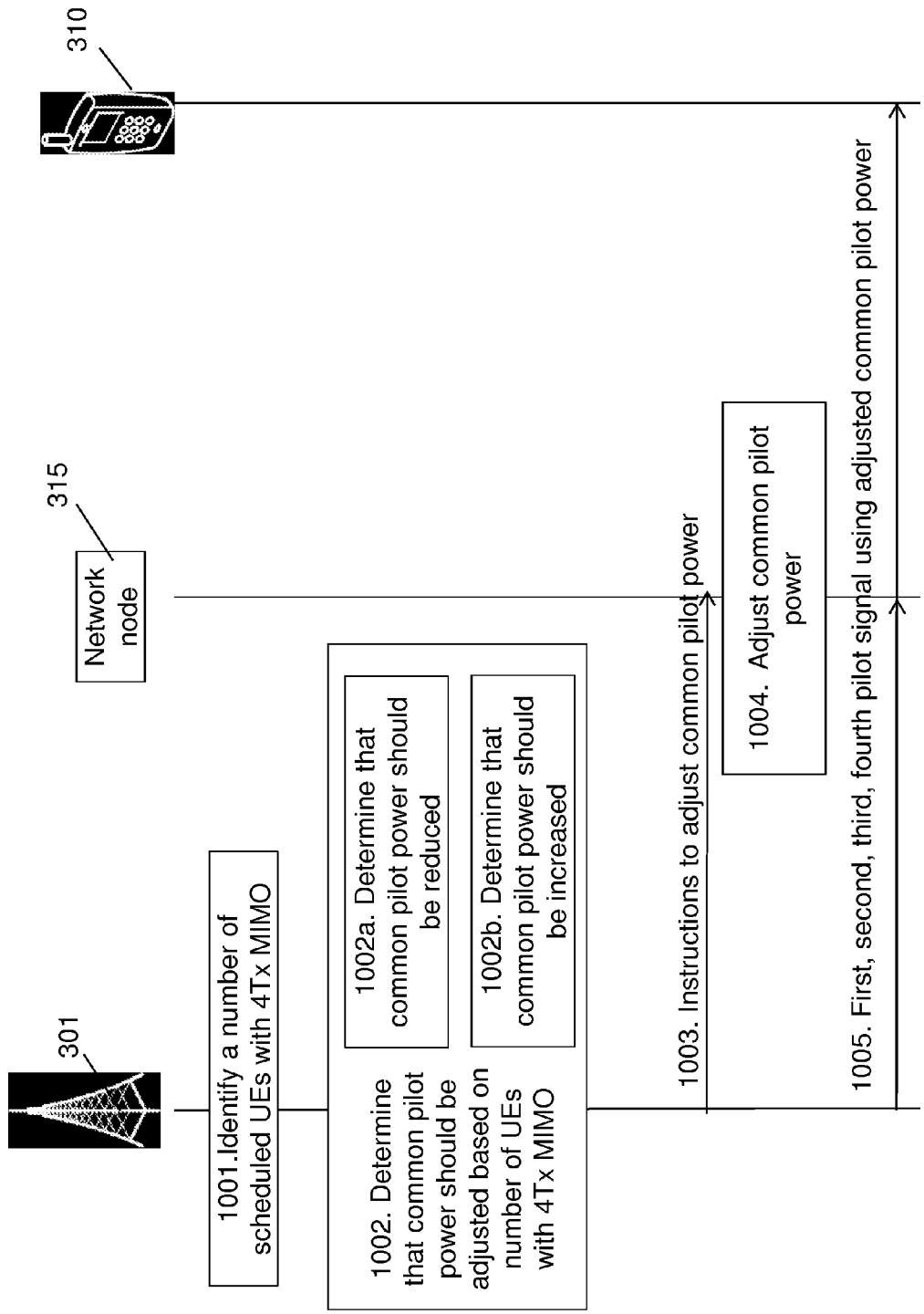

The method for determining adjustment of common pilot power, according to some embodiments will now be described with reference to the signalling diagram depicted in FIGS. 10a and 10b. FIGS. 10a and 10b are embodiments of FIGS. 4a and 4b described earlier. As mentioned above, the method in FIGS. 4a and 4b uses a general criterion. FIGS. 10a and 10b illustrates an embodiment where the criterion is represented by the number of scheduled user equipments 310 configured with 4Tx MIMO in the set of scheduled user equipments 310. FIG. 10*a* illustrates the case when the base station 301 is the node which adjusts the common pilot power and FIG. 10*b* illustrates the case when the network node 315 is the node which adjusts the common pilot power. As mentioned above, the base station 301 comprises a first transmit antenna 1201, a second transmit antenna 1202, a third transmit antenna 1203 and a fourth transmit antenna 1204. The base station 301 is connected to the user equipment 310 via the radio carrier 307. In some embodiments, the radio carrier 307 is a single downlink carrier or a multi-carrier. In some embodiments, the communications system 300 is a HSDPA system.

The method comprises the following steps, which steps may be performed in any suitable order:

Step 1001

This step is shown in FIGS. 10*a* and 10*b*. The base station 301 identifies a set of scheduled user equipments 310 in the communications system 300. The scheduled user equipments 310 are located in the cell 305 that the base station 301 serves. The base station 301 uses any suitable technique to identify the set of scheduled user equipments 310.

Step 1002

This step is shown in FIGS. 10*a* and 10*b*. The base station determines that the common pilot power should be adjusted based on a number of scheduled user equipment's 310 configured with 4Tx MIMO in the set of scheduled user equipments 310. In some embodiments, the common pilot power is determined to be increased at start of the HS-SCCH transmission.

Step 1002*a*

This step is shown in FIGS. 10*a* and 10*b* and is a substep of step 1002.

In some embodiments, when the number of scheduled user equipments 310 configured with 4Tx MIMO is zero, i.e. when no scheduled user equipments are configured with Tx, the base station 301 determines that the common pilot power should be reduced for the third transmit antenna 1203 and the fourth transmit antenna 1204. The reduction may be seen as keeping the common pilot power to a minimum level. It may be possible to set the power to e.g. 6-10 dB below the primary CPICH.

Step 1002*b*

This step is shown in FIGS. 10*a* and 10*b* and is a substep of step 1002.

In some embodiments, when the number of scheduled user equipment 310 configured with 4Tx MIMO is above a threshold, the base station 301 determines that the common pilot power for the third transmit antenna 1203 and the fourth transmit antenna 1204 should be increased. Compared to 2×2 MIMO, it is the power on the additional antennas, i.e. the third transmit antenna 1203 and the fourth transmit antenna 104, which is increased so that the demodulation performance of the data is secured. In this case a reasonable pilot power may be in the order of 3 dB below the primary CPICH. The threshold may a positive integer from 1 and above. The threshold may be predefined in the base station 301, or the threshold may be a dynamic threshold that may change during operation. The threshold may be received by the base station 301 from any suitable other node in the communications system 300.

One or more of the steps 1002*a* and 1002*b* may be performed.

Step 1003

This step is shown only in FIG. 10*b*. In some embodiments, the base station 301 transmits instructions to the network node 315 to adjust the common pilot power. The base station 301 performs this transmission when it has determined that the pilot power should be adjusted.

Step 1004

This step is shown in FIGS. 10*a* and 10*b*. In some embodiments, the base station 301 or the network node 315 adjusts the common pilot power for the third transmit antenna 1203 and the fourth transmit antenna 1204 based on the determination in step 1002.

Step 1005

This step is shown in FIGS. 10*a* and 10*b*. In some embodiments, the base station 301 transmits a first pilot signal, a second pilot signal, a third pilot signal and a fourth pilot signal to the user equipment 310 using the adjusted common pilot power for the third transmit antenna 1203 and the fourth transmit antenna 1204. In some embodiments, the base station 301 transmits these four pilot signals via the network node 315, as seen in FIG. 10*b*.

In some embodiments, the base station 301 transmits the first pilot signal, the second pilot signal, the third pilot signal and the fourth pilot signal to the user equipment 310 using the reduced common pilot power or the increased common pilot power, possibly via the or the network node 315.

Figure 11:
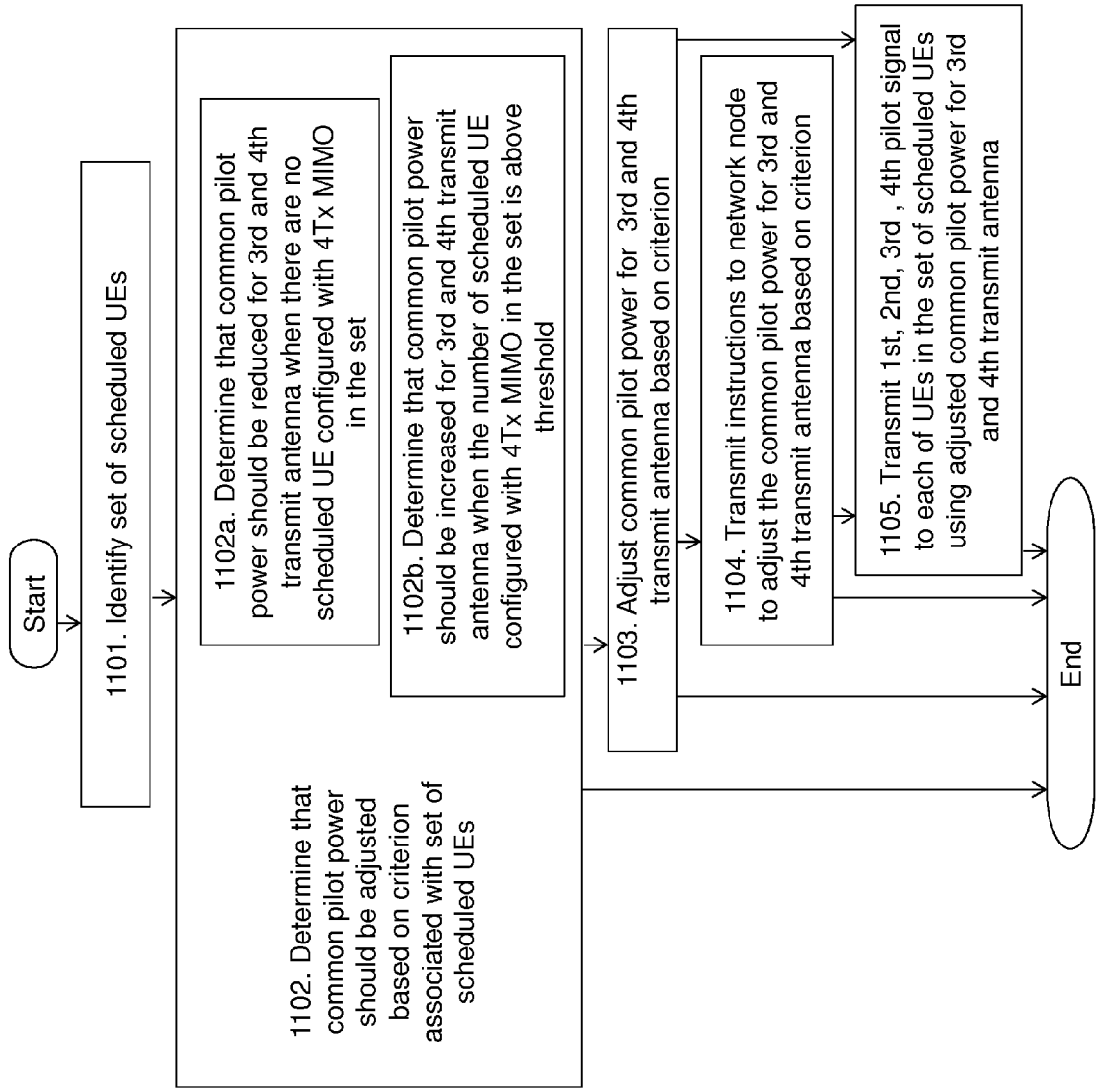
FIG. 11 is a flow chart illustrating embodiments of a method in a base station.

The method described above will now be described seen from the perspective of the base station 301. FIG. 11 is a flowchart describing the present method in the base station 301 for determining adjustment of common pilot power in the 4Tx communications system 300. As mentioned above, the base station 301 comprises a first transmit antenna 1201, a second transmit antenna 1202, a third transmit antenna 1203 and a fourth transmit antenna 1204. The communications system 300 may be a HSDPA system. The method comprises the further steps to be performed by the base station 301, which steps may be performed in any suitable order than described below:

Step 1101

This step corresponds to step 401 in FIGS. 4*a* and 4*b* and to step 1001 in FIGS. 10*a* and 10*b*.

The base station 301 identifies a set of scheduled user equipments 310 in the communications system 300. This step may be performed by a processor, such as e.g. the processor 1207 or by an identifying unit 1205 as described below.

Step 1102

This step corresponds to step 402 in FIGS. 4*a* and 4*b* and step 1002 in FIGS. 10*a* and 10*b*.

The base station 301 determines that the common pilot power should be adjusted based on a criterion associated with the set of scheduled user equipments 310.

The criterion may represents at least one of a CSI estimate associated with the set of scheduled user equipments 310 and a number of scheduled user equipments 310 configured with 4Tx MIMO in the set of scheduled user equipments 310.

This step may be performed by a processor, such as e.g. the processor 1207 or by an identifying unit 1205 as described below.

Step 1102*a*

This step corresponds to step 402*a* in FIGS. 4*a* and 4*b* and step 1002*a* in FIGS. 10*a* and 10*b*.

In some embodiments, when the criterion is associated with the number of scheduled user equipments 310 configured with 4Tx MIMO in the set of scheduled user equipments 310, the base station 301 determines that the common pilot power should be reduced for the third transmit antenna 1203 and the fourth transmit antenna 1204 when there are no scheduled user equipments configured with 4Tx MIMO in the set of scheduled user equipments 310. The common pilot power may be adjusted by reducing it with of 6-10 dB.

Step 1102b

This step corresponds to step 402b in FIGS. 4a and 4b and step 1002b in FIGS. 10a and 10b.

In some embodiments, when the criterion is associated with the number of scheduled user equipments 310 configured with 4Tx MIMO in the set of scheduled user equipments 310, the base station 301 determines that the common pilot power should be increased for the third transmit antenna 1203 and the fourth transmit antenna 1204 when the number of scheduled user equipments 310 configured with 4Tx MIMO in the set of scheduled user equipments 310 is above a threshold. The common pilot power may be adjusted by increasing it with 3 dB. The common pilot power may be adjusted by increasing it at start of a HS-SCCH transmission.

Step 1103

This step corresponds to step 404 in FIG. 4a and step 1004 in FIG. 10a.

In some embodiments, the base station 301 adjusts the common pilot power for the third transmit antenna 1203 and the fourth transmit antenna 1204 based on the criterion.

Step 1104

This step corresponds to step 403 in FIG. 4b and step 1003 in FIG. 10b.

In some embodiments, the base station 301 transmits instructions to a network node 315 to adjust the common pilot power for the third transmit antenna 1203 and the fourth transmit antenna 1204 based on the criterion. Step 1004 is an alternative to step 1003, i.e. in case the base station 310 adjusts the common pilot power in step 1003, the base station 301 does not transmit the instructions to the network node 315 in step 1104.

Step 1105

This step corresponds to step 405 in FIGS. 4a and 4b and step 1005 in FIGS. 10a and 10b.

In some embodiments, the base station 301 transmits a first pilot signal, a second pilot signal, a third pilot signal and a fourth pilot signal to each of the user equipments in the set of scheduled user equipments 310 using the adjusted common pilot power for the third transmit antenna 1203 and the fourth transmit antenna 1204. The base station 301 may transmit these signals via the network node 315.

In some embodiments, the base station 301 transmits the first pilot signal, the second pilot signal, the third pilot signal and the fourth pilot signal to each of the user equipments in the set of user equipments 310 using the reduced common pilot power or the increased common pilot power.

Figure 12:
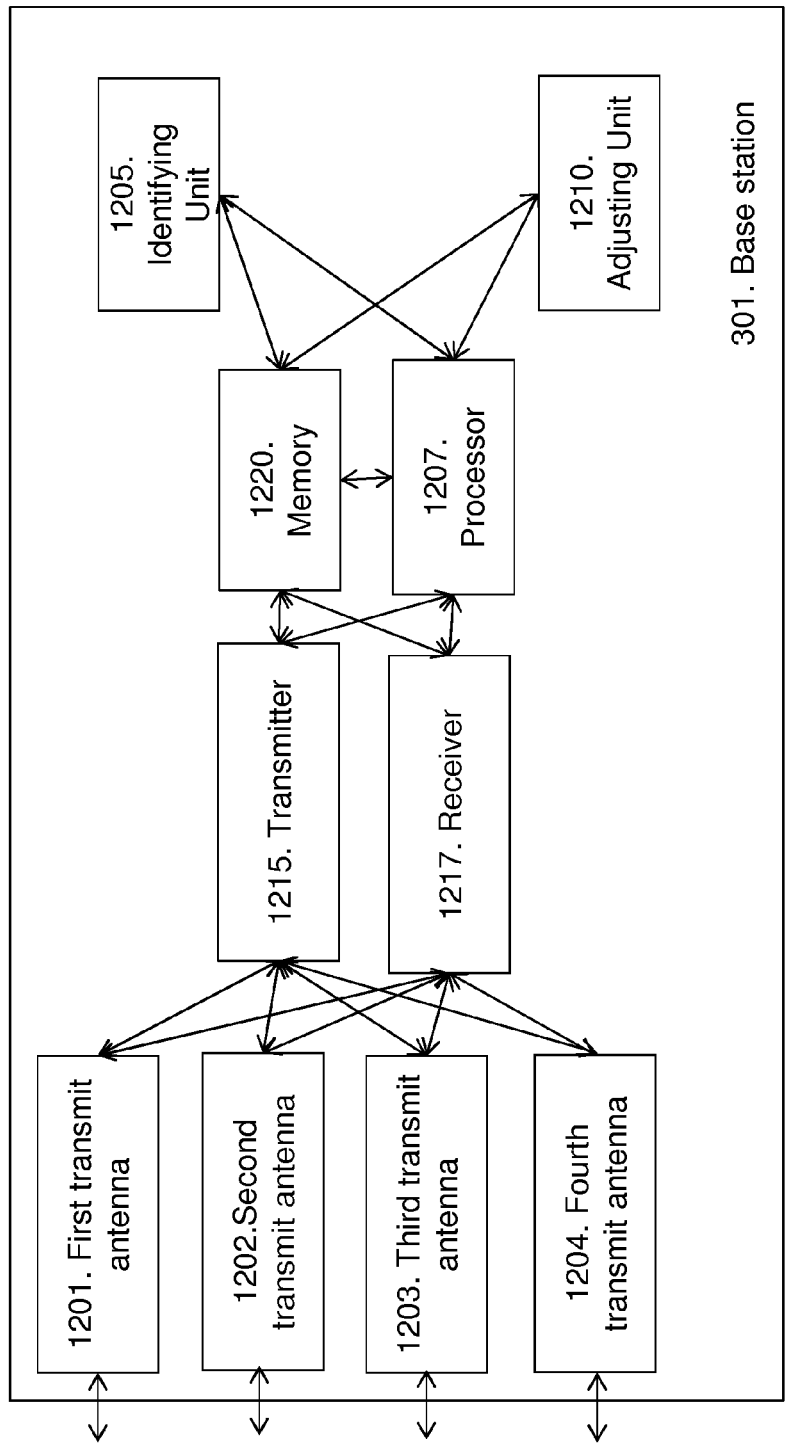
FIG. 12 is a schematic block diagram illustrating embodiments of a base station

To perform the method steps shown in FIG. 11 for determining adjustment of common pilot power in a 4Tx communications system 300, the base station 301 comprises an arrangement as shown in FIG. 12. The communications system 300 may be a HSDPA system. The base station 301 comprises a first transmit antenna 1201, a second transmit antenna 1202, a third transmit antenna 1203 and a fourth transmit antenna 1204.

The base station 301 further comprises an identifying unit 1205 configured to identify a set of scheduled user equipments 310 in the communications system 300.

The base station 301 further comprises a processor 1207 configured to determine that the common pilot power should be adjusted based on a criterion associated with the set of scheduled user equipments 310. The criterion may represent at least one of a CSI estimate associated with the set of scheduled user equipments 310 and a number of scheduled user equipments 310 configured with 4Tx MIMO in the set of scheduled user equipments 310. In some embodiments, when the criterion is associated with the number of scheduled user equipments 310 configured with 4Tx MIMO in the set of scheduled user equipments 310, the processor 1207 is further configured to determine that the common pilot power should be reduced for the third transmit antenna 1203 and the fourth transmit antenna 1204 when there are no scheduled user equipments configured with 4Tx MIMO in the set of scheduled user equipments 310. In some embodiments, when the criterion is associated with the number of scheduled user equipments 310 configured with 4Tx MIMO in the set of scheduled user equipments 310, the processor 1207 is further configured to determine that the common pilot power should be increased for the third transmit antenna 1203 and the fourth transmit antenna 1204 when the number of scheduled user equipments 310 configured with 4Tx MIMO in the set of scheduled user equipments 310 is above a threshold.

In some embodiments, the base station 301 further comprises an adjusting unit 1210 configured to adjust the common pilot power for the third transmit antenna 1203 and the fourth transmit antenna 1204 based on the criterion. The common pilot power may be adjusted by a reducing it with of 6-10 dB. The common pilot power may be adjusted by increasing it with 3 dB. The common pilot power may be adjusted by increasing it at start of the HS-SCCH transmission.

The processor 1207 described above may be further configured to perform the tasks of the identifying unit 1205, i.e. the processor is configured to identify a set of scheduled user equipments 310 in the communications system 300 and/or the tasks of the adjusting unit 1210, i.e. the processor 1207 is configured to adjust the common pilot power for the third transmit antenna 1203 and the fourth transmit antenna 1204 based on the criterion.

In some embodiments, the base station 301 further comprises a transmitter 1215 configured to transmit instructions to a network node 315 to adjust the common pilot power for the third transmit antenna 1203 and the fourth transmit antenna 1204 based on the criterion. In some embodiment, the transmitter 1215 is further configured to transmit a first pilot signal, a second pilot signal, a third pilot signal and a fourth pilot signal to each of the user equipments in the set of scheduled user equipment's 310 using adjusted common pilot power for the third transmit antenna 1203 and the fourth transmit antenna 1204. The transmitter 1215 may be further configured to transmit the first pilot signal, the second pilot signal, the third pilot signal and the fourth pilot signal to each of the user equipment's in the set of user equipments 310 using the at least one reduced common pilot power or the at least one increased common pilot power.

In some embodiments, the base station 301 further comprises a receiver 1217 configured to receive data from other nodes in the communications system 300, such as e.g. the user equipment 310.

The base station 301 may further comprise a memory 1220 comprising one or more memory units. The memory 1220 is arranged to be used to store data, received data streams, power level measurements, the number of scheduled user equipments 310 the level of adjustment of the pilot power, the first, second, third and fourth pilot signals, the transmitted adjusted pilot power and applications to perform the methods herein when being executed in the base station 301.

Those skilled in the art will also appreciate that the first antenna 1201, the second antenna 1202, the third antenna 1203, the fourth antenna 1204, the identifying unit 1205, the adjusting unit 1210, the transmitter 1215, the receiver 1217 and the memory 1220 described above may refer to a combination of analog and digital circuits, and/or one or more processors configured with software and/or firmware, e.g. stored in a memory, that when executed by the one or more processors such as the processor 1207 perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Figure 13:
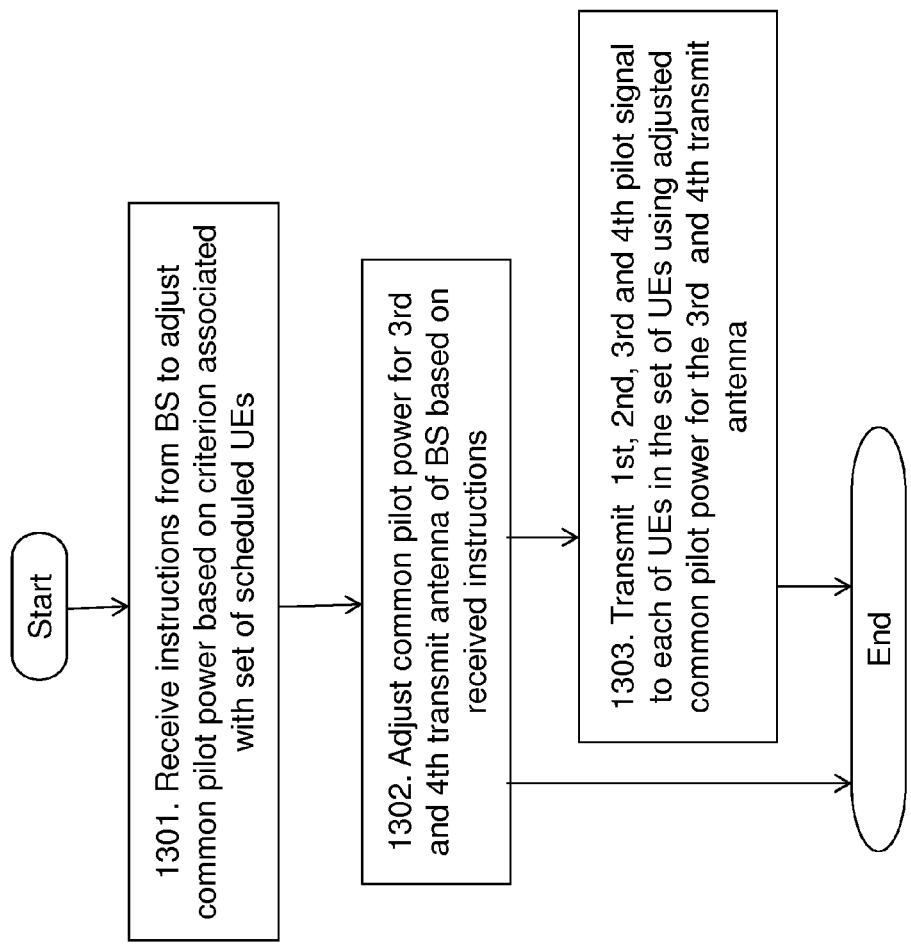
FIG. 13 is a flow chart illustrating embodiments of a method in a network node.

The method described above will now be described seen from the perspective of the network node 315. FIG. 13 is a flowchart describing the present method in the network node 315 for determining adjustment of common pilot power in the 4Tx communications system 300. As mentioned above, the base station 301 comprises a first transmit antenna 1201, a second transmit antenna 1202, a third transmit antenna 1203 and a fourth transmit antenna 1204. The communications system 300 may be a HSDPA system. The network node 315 may be a radio network controller 315. The method comprises the further steps to be performed by the network node 315, which steps may be performed in any suitable order than described below:

Step 1301

This step corresponds to step 403 in FIG. 4b and step 1003 in FIG. 10b.

The network node 315 receives instructions from the base station 301 to adjust the common pilot power based on the criterion associated with the set of scheduled user equipments 310. The criterion may represent at least one of the CSI estimate associated with the set of scheduled user equipments 310 and the number of scheduled user equipments 310 configured with 4Tx MIMO in the set of scheduled user equipments 310.

Step 1302

This step corresponds to step 404 in FIG. 4b and step 1004 in FIG. 10b.

The network node 315 adjusts the common pilot power for the third transmit antenna 1203 and the fourth transmit antenna 1204 of the base station 301 based on the received instructions. The common pilot power may be adjusted by a reducing it with of 6-10 dB. The common pilot power may be adjusted by increasing it with 3 dB. The common pilot power may be adjusted by increasing it at start of the HS-SCCH transmission.

This step may be performed by a processor such as e.g. the processor 1415 described below, or by an adjusting unit 1403 also described below.

Step 1303

This step corresponds to step 405 in FIG. 4b and step 1005 in FIG. 10b.

In some embodiments, the network node 315 transmits, i.e. forwards, a first pilot signal, a second pilot signal, a third pilot signal and a fourth pilot signal to each of the user equipments 310 in the set of user equipments 310 using the adjusted common pilot power for the third transmit antenna 1203 and the fourth transmit antenna 1204. The first pilot signal, second pilot signal, third pilot signal and fourth pilot signal has been received by the network node 315 from the base station 301 before it transmits/forwards them to each of the user equipment's 310.

Figure 14:
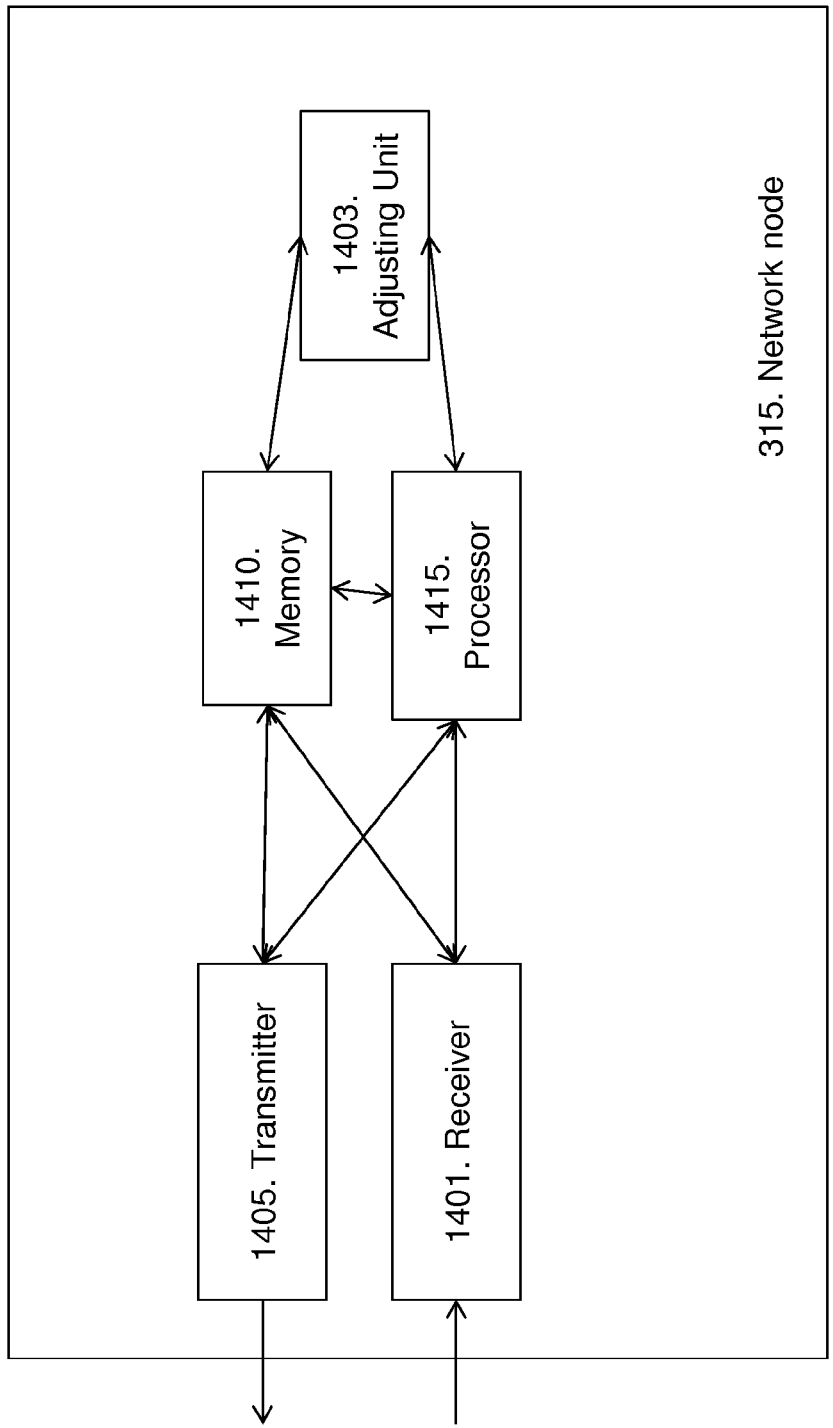
FIG. 14 is a schematic block diagram illustrating embodiments of a network node.

To perform the method steps shown in FIG. 13 for adjusting common pilot power in the 4Tx communications system 300, the network node 315 comprises an arrangement as shown in FIG. 14. The communications system 300 may be a HSDPA system. The network node 315 may be a radio network controller 315.

The network node 315 comprises a receiver 1401 configured to receive instructions from the base station 301 to adjust the common pilot power based on a criterion associated with a set of scheduled user equipments 310. The base station 301 comprises the first transmit antenna 1201, the second transmit antenna 1202, the third transmit antenna 1203 and the fourth transmit antenna 1204. The criterion may represent at least one the CSI estimate associated with the set of scheduled user equipments 310 and the number of scheduled user equipments 310 configured with 4Tx MIMO in the set of scheduled user equipments 310.

The network node 315 comprises an adjusting unit 1403 configured to adjust the common pilot power for the third transmit antenna 1203 and the fourth transmit antenna 1204 of the base station 301 based on the received instructions. The common pilot power may be adjusted by a reducing it with of 6-10 dB. The common pilot power may be adjusted by increasing it with 3 dB. The common pilot power may be adjusted by increasing it at start of a HS-SCCH transmission. In some embodiments, the tasks of the adjusting unit 1403 is performed by a processor instead of the adjusting unit 1403, e.g. by the processor 1415 described below.

In some embodiments, the network node comprises a transmitter 1405 configured to transmit a first pilot signal, a second pilot signal, a third pilot signal and a fourth pilot signal to each of the user equipments 310 in the set of user equipments 310 using the at least one adjusted common pilot power for the third transmit antenna 1203 and the fourth transmit antenna 1204.

The network node 315 may further comprise a memory 1410 comprising one or more memory units. The memory 1110 is arranged to be used to store data, received data streams, power level measurements, the number of scheduled user equipments 310 the level of adjustment of the pilot power, the first, second, third and fourth pilot signals, the transmitted adjusted pilot power and applications to perform the methods herein when being executed in the network node 315.

Those skilled in the art will also appreciate that the receiver 1401, the adjusting unit 1403 and the transmitter 1405 described above may refer to a combination of analog and digital circuits, and/or one or more processors configured with software and/or firmware, e.g. stored in the memory 1410, that when executed by the one or more processors such as a processor 1415. One or more of these processors, as well as the other digital hardware, may be included in a single ASIC, or several processors and various digital hardware may be distributed among several separate components, whether individually packaged or assembled into a SoC.

The present mechanism for adjusting common pilot power in a four-way transmit antenna communications system 300 may be implemented through one or more processors, such as a processor 1207 in the base station arrangement depicted in FIG. 12 and/or a processor 1415 in the network node arrangement depicted in FIG. 14, together with computer program code for performing the functions of the embodiments herein. The processor may be for example a Digital Signal Processor (DSP), ASIC processor, Field-programmable gate array (FPGA) processor or microprocessor. The program code mentioned above may also be provided as a computer program product, for instance in the form of a data carrier carrying computer program code for performing the embodiments herein when being loaded into the base station 301 and/or the network node 315. One such carrier may be in the form of a CD ROM disc. It is however feasible with other data carriers such as a memory stick. The computer program code can furthermore be provided as pure program code on a server and downloaded to the base station 301 and/or the network node 315.

Although the described solutions may be implemented in any appropriate type of telecommunication system supporting any suitable communication standards and using any suitable components, particular embodiments of the described solutions may be implemented in an HSDPA system, such as that illustrated in FIG. 3.

The example system may further comprise any additional elements suitable to support communication between user equipments or between a user equipments and another communication device, such as a landline telephone. Although the illustrated user equipments may represent a communication device that comprises any suitable combination of hardware and/or software, this user equipments may, in particular embodiments, represent a device such as the example user equipment 310 illustrated in greater detail by FIG. 15. The user equipment 310 illustrated in FIG. 15 corresponds to the user equipment 310 illustrated in FIG. 3. Similarly, although the illustrated nodes may represent nodes that comprises any suitable combination of hardware and/or software, these nodes may, in particular embodiments, represent devices such as the example node illustrated in greater detail by FIG. 16. The node illustrated in FIG. 16 corresponds to either the base station 301 and/or the network node 315 illustrated in FIG. 3.

Figure 15:
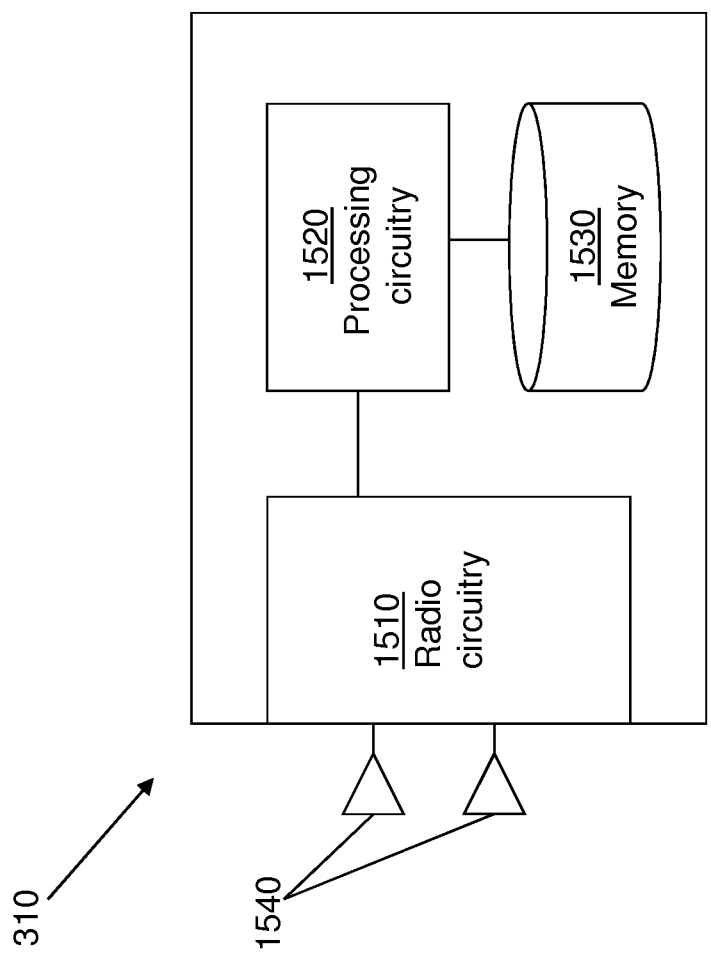
FIG. 15 is a schematic block diagram illustrating embodiments of a user equipment.

As shown in FIG. 15, the example user equipment 310 comprises radio circuitry 1510, processing circuitry 1520, a memory 1530, and at least one antenna 1540. The radio circuitry 1510 may comprise RF circuitry and baseband processing circuitry (not shown). In particular embodiments, some or all of the functionality described above as being provided by mobile communication devices or other forms of wireless device may be provided by the processing circuitry 1520 executing instructions stored on a computer-readable medium, such as the memory 1530 shown in FIG. 15. Alternative embodiments of the user equipment 310 may comprise additional components beyond those shown in FIG. 15 that may be responsible for providing certain aspects of the wireless device's functionality, including any of the functionality described above and/or any functionality necessary to support the solution described above.

Figure 16:
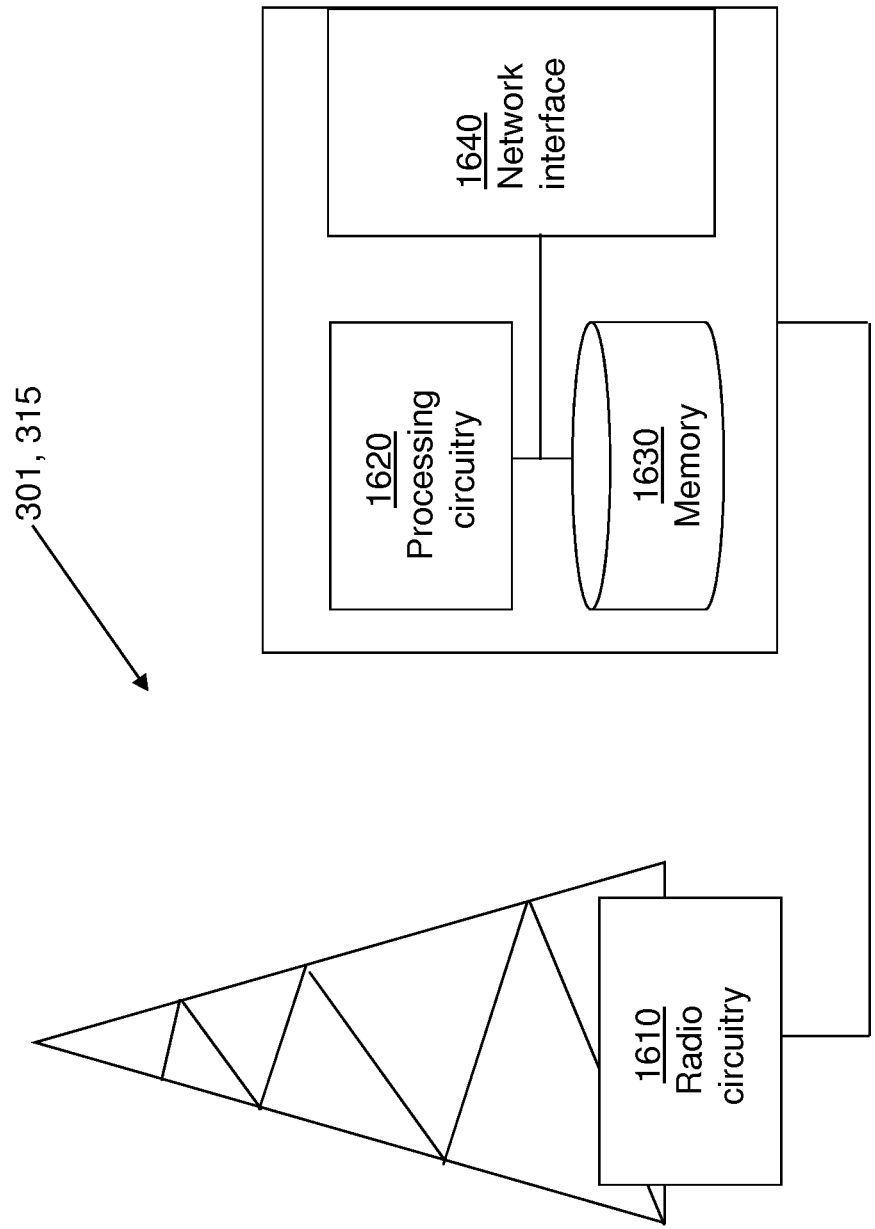
FIG. 16 is a schematic block diagram illustrating embodiments of a node.

As shown in FIG. 16, the example node 301, 315 comprises radio circuitry 1610, processing circuitry 1620, a memory 1630, a network interface 1640 and at least one antenna (not shown). The processing circuitry 1620 may comprise RF circuitry and baseband processing circuitry (not shown). In particular embodiments, some or all of the functionality described above as being provided by a mobile base station, a base station controller, a relay node, a NodeB, an enhanced NodeB, a radio network controller and/or any other type of mobile communications node may be provided by the processing circuitry 1620 executing instructions stored on a computer-readable medium, such as the memory 1630 shown in FIG. 16. Alternative embodiments of the node may comprise additional components responsible for providing additional functionality, including any of the functionality identified above and/or any functionality necessary to support the solution described above. The processing circuitry 1620 corresponds to the processor 1207 illustrated in FIG. 12 and/or the processor 1415 illustrated in FIG. 14. The memory 1630 in FIG. 16 corresponds to the memory 1220 in FIG. 12 and/or the memory 1410 in FIG. 14. The network interface 1640 in FIG. 16 corresponds to the first transmit antenna 1201, the second transmit antenna 1202, the third transmit antenna 1203, the fourth transmit antenna 1204, the transmitter 1215 and the receiver 1217 in FIG. 12.

The embodiments herein are not limited to the above described embodiments. Various alternatives, modifications and equivalents may be used. Therefore, the above embodiments should not be taken as limiting the scope of the embodiments.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The invention claimed is:

1. A method in a network node for adjusting common pilot power in a four-way transmit antenna (4Tx) communications system, the method comprising:
   receiving instructions from a base station to adjust the common pilot power based on a criterion associated with a set of scheduled mobile terminals, which base station comprises a first transmit antenna, a second transmit antenna, a third transmit antenna and a fourth transmit antenna, wherein the criterion represents at least one of a Channel State Information (CSI) estimate associated with the set of scheduled mobile terminals and a number of scheduled mobile terminals configured with 4Tx Multiple Input Multiple Output (MIMO) in the set of scheduled mobile terminals; and
   adjusting the common pilot power for the third transmit antenna and the fourth transmit antenna of the base station based on the received instructions.

2. The method of claim 1, further comprising:
   transmitting a first pilot signal, a second pilot signal, a third pilot signal and a fourth pilot signal to each of the mobile terminals in the set of mobile terminals using the adjusted common pilot power for the third transmit antenna and the fourth transmit antenna.

3. The method of claim 1, wherein the network node is a radio network controller.

4. The method of claim 1, wherein the common pilot power is adjusted by reducing it by 6-10 dB.

5. The method of claim 1, wherein the common pilot power is adjusted by increasing it by 3 dB.

6. The method of claim 1, wherein the common pilot power is adjusted by increasing it at start of a High Speed-Shared Control CHannel (HS-SCCH) transmission.

7. The method of claim 1, wherein the communications system is a High Speed Downlink Packet Access (HSDPA) system.

8. A network node for adjusting common pilot power in a four-way transmit antenna (4Tx) communications system, the network node comprising:
   a receiver configured to receive instructions from a base station to adjust the common pilot power based on a criterion associated with a set of scheduled mobile terminals, which base station comprises a first transmit antenna, a second transmit antenna, a third transmit antenna and a fourth transmit antenna, wherein the criterion represents at least one of a Channel State Information (CSI) estimate associated with the set of scheduled mobile terminals and a number of scheduled mobile terminals configured with 4Tx Multiple Input Multiple Output (MIMO) in the set of scheduled mobile terminals; and
   an adjusting circuit configured to adjust the common pilot power for the third transmit antenna and the fourth transmit antenna of the base station based on the received instructions.

9. The network node of claim 8, further comprising:
a transmitter configured to transmit a first pilot signal, a second pilot signal, a third pilot signal and a fourth pilot signal to each of the mobile terminals in the set of mobile terminals using the at least one adjusted common pilot power for the third transmit antenna and the fourth transmit antenna.

10. The network node of claim 8, wherein the network node is a radio network controller.

11. The network node of claim 8, wherein the adjusting circuit is configured to adjust the common pilot power by reducing it by 6-10 dB.

12. The network node of claim 8, wherein the adjusting circuit is configured to adjust the common pilot power by increasing it by 3 dB.

13. The network node of claim 8, wherein the adjusting circuit is configured to adjust the common pilot power by increasing it at start of a High Speed-Shared Control CHannel (HS-SCCH) transmission.

14. The network node of claim 8, wherein the communications system is a High Speed Downlink Packet Access (HSDPA) system.

\* \* \* \* \*